(12) United States Patent
Jayasimha et al.

(10) Patent No.: US 11,989,555 B2
(45) Date of Patent: May 21, 2024

(54) INSTRUCTIONS FOR REMOTE ATOMIC OPERATIONS

(71) Applicant: Intel Corporation, Santa Clara, CA (US)

(72) Inventors: Doddaballapur N. Jayasimha, Saratoga, CA (US); Jonas Svennebring, Sollentuna (SE); Samantika S. Sury, Westford, MA (US); Christopher J. Hughes, Santa Clara, CA (US); Jong Soo Park, Santa Clara, CA (US); Lingxiang Xiang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 15/638,120

(22) Filed: Jun. 29, 2017

(65) Prior Publication Data

US 2019/0004810 A1   Jan. 3, 2019

(51) Int. Cl.
| | |
|---|---|
| G06F 9/30 | (2018.01) |
| G06F 9/38 | (2018.01) |
| G06F 9/46 | (2006.01) |
| G06F 13/28 | (2006.01) |

(52) U.S. Cl.
CPC .......... *G06F 9/3004* (2013.01); *G06F 9/3001* (2013.01); *G06F 9/30185* (2013.01); *G06F 9/3836* (2013.01); *G06F 9/46* (2013.01); *G06F 13/28* (2013.01)

(58) Field of Classification Search
CPC ............................. G06F 9/3836; G06F 9/3004
See application file for complete search history.

(56) References Cited

U.S. PATENT DOCUMENTS

| | | | | |
|---|---|---|---|---|
| 5,542,084 A | * | 7/1996 | Lowe, Jr. .............. | G06F 9/3001 |
| | | | | 345/501 |
| 5,838,960 A | * | 11/1998 | Harriman, Jr. ........ | G06F 9/3001 |
| | | | | 712/221 |
| 5,918,064 A | * | 6/1999 | Miller ................... | G06F 13/124 |
| | | | | 712/38 |
| 7,533,242 B1 | * | 5/2009 | Moll ................... | G06F 12/0862 |
| | | | | 711/213 |

(Continued)

*Primary Examiner* — John M Lindlof
(74) *Attorney, Agent, or Firm* — NICHOLSON DE VOS WEBSTER & ELLIOTT LLP

(57) ABSTRACT

Disclosed embodiments relate to atomic memory operations. In one example, a method of executing an instruction atomically and with weak order includes: fetching, by fetch circuitry, the instruction from code storage, the instruction including an opcode, a source identifier, and a destination identifier, decoding, by decode circuitry, the fetched instruction, selecting, by a scheduling circuit, an execution circuit among multiple circuits in a system, scheduling, by the scheduling circuit, execution of the decoded instruction out of order with respect to other instructions, with an order selected to optimize at least one of latency, throughput, power, and performance, and executing the decoded instruction, by the execution circuit, to: atomically read a datum from a location identified by the destination identifier, perform an operation on the datum as specified by the opcode, the operation to use a source operand identified by the source identifier, and write a result back to the location.

22 Claims, 21 Drawing Sheets

(56) References Cited

U.S. PATENT DOCUMENTS

| | | | |
|---|---|---|---|
| 2007/0130372 A1* | 6/2007 | Irish | G06F 13/12 |
| | | | 710/5 |
| 2007/0250669 A1* | 10/2007 | Arimilli | G06F 9/3842 |
| | | | 711/154 |
| 2009/0201935 A1* | 8/2009 | Hass | H04L 69/22 |
| | | | 370/395.32 |
| 2014/0281402 A1* | 9/2014 | Comparan | G06F 9/30189 |
| | | | 712/214 |
| 2015/0127928 A1* | 5/2015 | Burger | G06F 9/3836 |
| | | | 712/229 |
| 2016/0217080 A1* | 7/2016 | Solihin | G06F 12/0891 |
| 2016/0371081 A1* | 12/2016 | Powers | G06F 9/45504 |

* cited by examiner

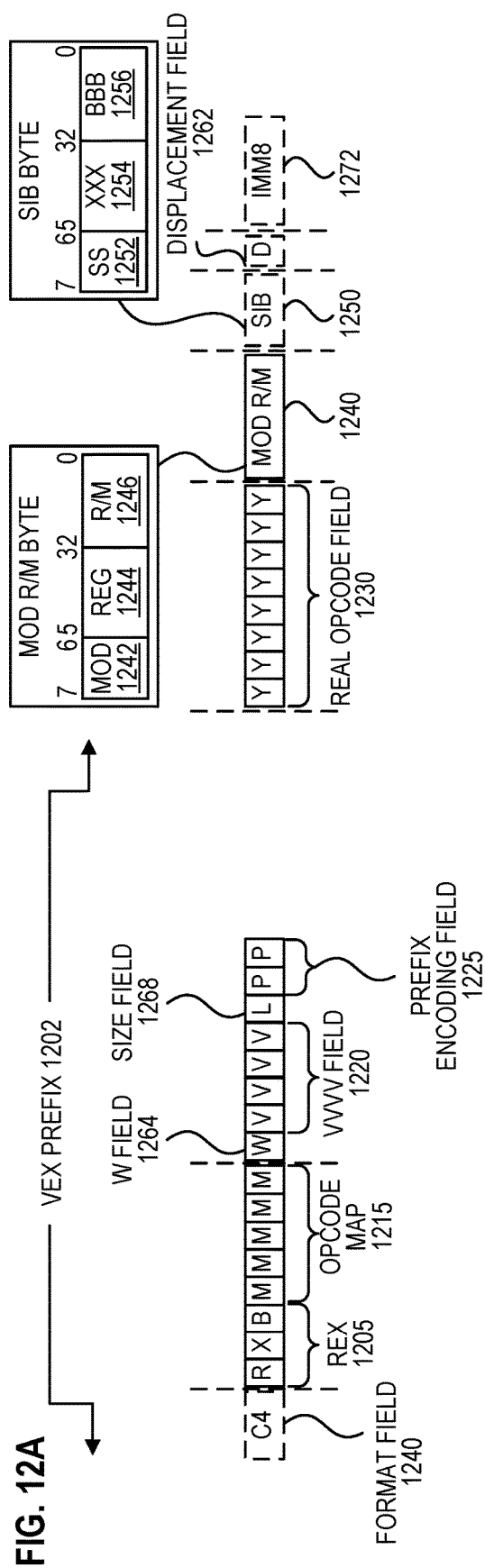
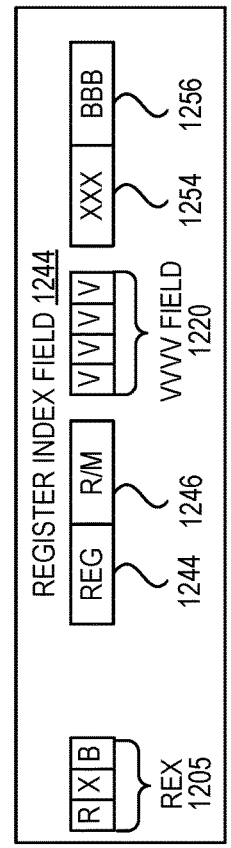
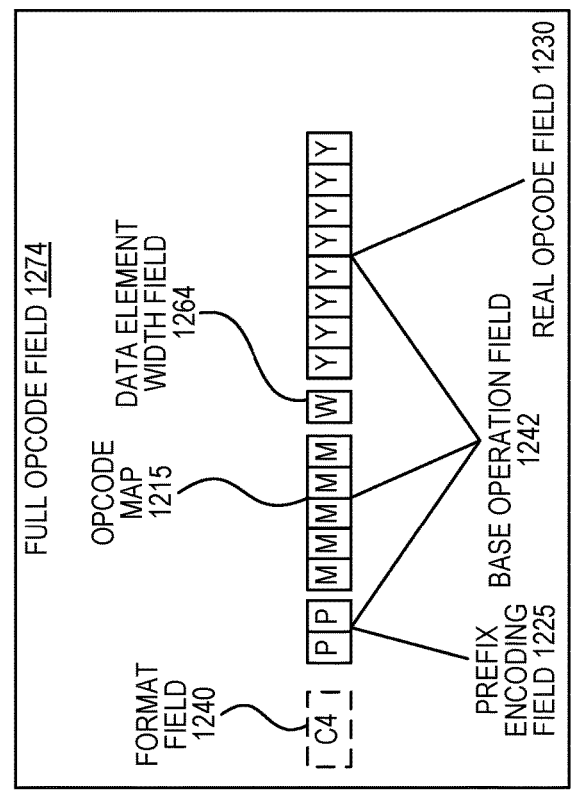
FIG. 12A
FIG. 12B
FIG. 12C

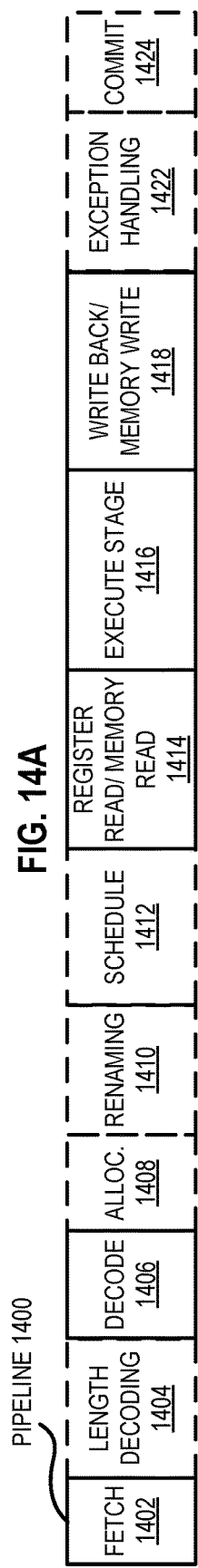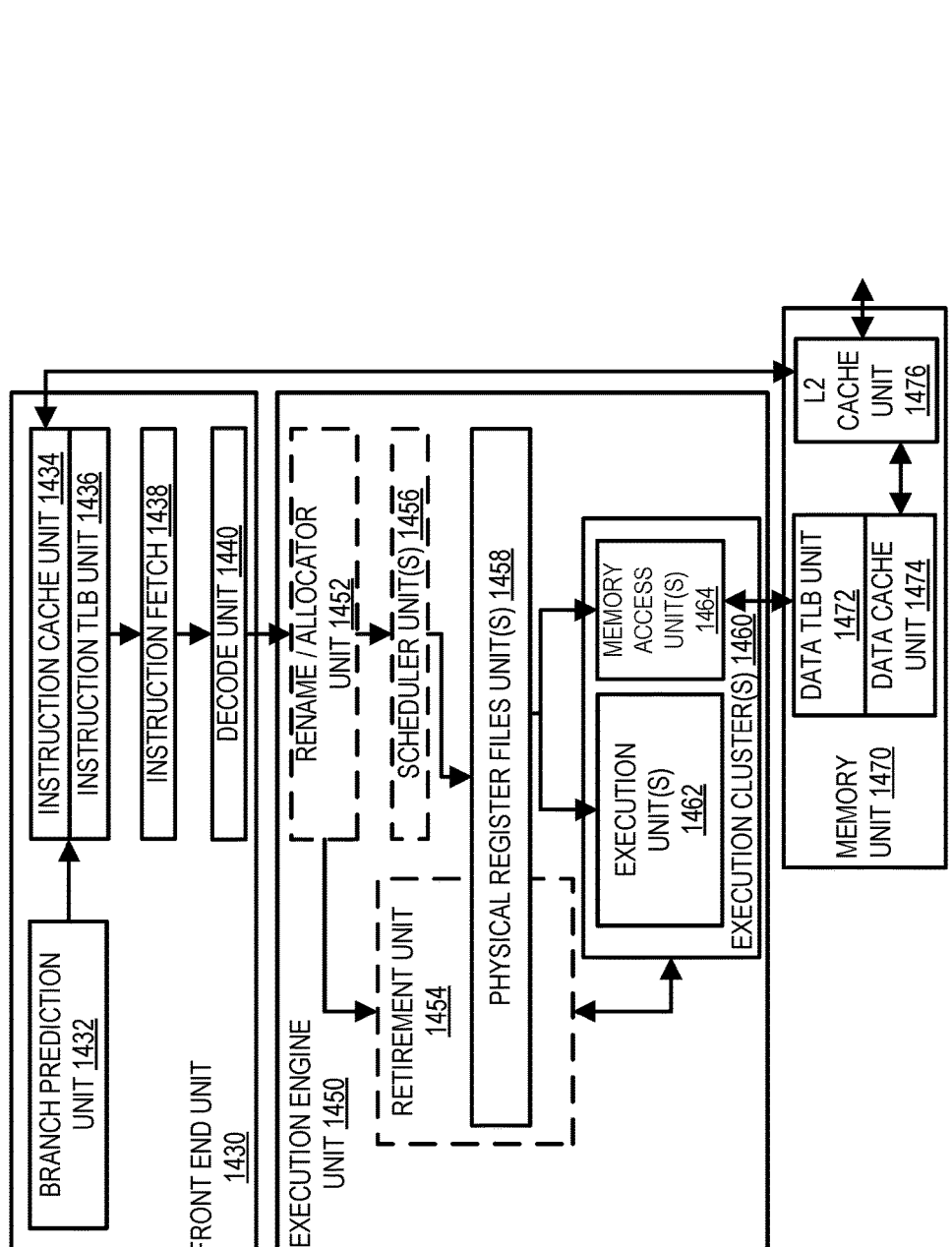

INSTRUCTIONS FOR REMOTE ATOMIC OPERATIONS

FIELD OF INVENTION

The field of invention relates generally to computer processor architecture, and, more specifically, to instructions for remote atomic operations (RAO).

BACKGROUND

An atomic memory operation is one during which a processor core can read a location, modify it, and write it back in what appears to other cores as a single operation. A core can refer either to a physical core in single threaded architectures or a logical core in multithreaded architectures. An atomic memory operation in a multi-core system is one that cannot be divided into any smaller parts, or appears to other cores in the system to be a single operation. Read-modify-write is one of a class of atomic memory operations that both reads a memory location and writes a new value into it as part of the same operation, at least as it appears to other cores in the multi-core system.

In general, execution of atomic operations in a multi-core system, especially with contention among the cores, can be costly and inefficient. A cache line holding a variable being accessed atomically can get "ping-ponged" among multiple cores and multiple private caches across a shared interconnect. Coherence overhead can also limit throughput, for example to less than one atomic operation on a given cache line every 100 clock cycles. In the case where hundreds of threads are trying to access the same line, the last thread in line may have to wait a very long time, such as, for example, more than 25,000 clock cycles.

In addition to the problem of latency, cache line ping-ponging puts significant pressure on interconnect network traffic among plural nodes.

BRIEF DESCRIPTION OF THE DRAWINGS

The present invention is illustrated by way of example and not limitation in the figures of the accompanying drawings, in which like references indicate similar elements and in which:

FIGS. 12A-12B are block diagrams illustrating a generic vector friendly instruction format and instruction templates thereof according to embodiments of the invention;

FIG. 12A is a block diagram illustrating a generic vector friendly instruction format and class A instruction templates thereof according to embodiments of the invention;

FIG. 12B is a block diagram illustrating the generic vector friendly instruction format and class B instruction templates thereof according to embodiments of the invention;

FIG. 12C is a block diagram illustrating an exemplary specific vector friendly instruction format according to embodiments of the invention;

FIG. 14A is a block diagram illustrating both an exemplary in-order pipeline and an exemplary register renaming, out-of-order issue/execution pipeline according to embodiments of the invention;

FIG. 14B is a block diagram illustrating both an exemplary embodiment of an in-order architecture core and an exemplary register renaming, out-of-order issue/execution architecture core to be included in a processor according to embodiments of the invention;

FIG. 15A is a block diagram of a single processor core, along with its connection to the on-die interconnect network and with its local subset of the Level 2 (L2) cache, according to embodiments of the invention;

FIG. 15B is an expanded view of part of the processor core in FIG. 15A according to embodiments of the invention;

FIG. 17 is a block diagram of a system in accordance with one embodiment of the present invention;

FIG. 18 is a block diagram of a first more specific exemplary system in accordance with an embodiment of the present invention;

FIG. 19 is a block diagram of a second more specific exemplary system in accordance with an embodiment of the present invention;

FIG. 20 is a block diagram of a System-on-a-Chip (SoC) in accordance with an embodiment of the present invention.

DETAILED DESCRIPTION

Figure 1:
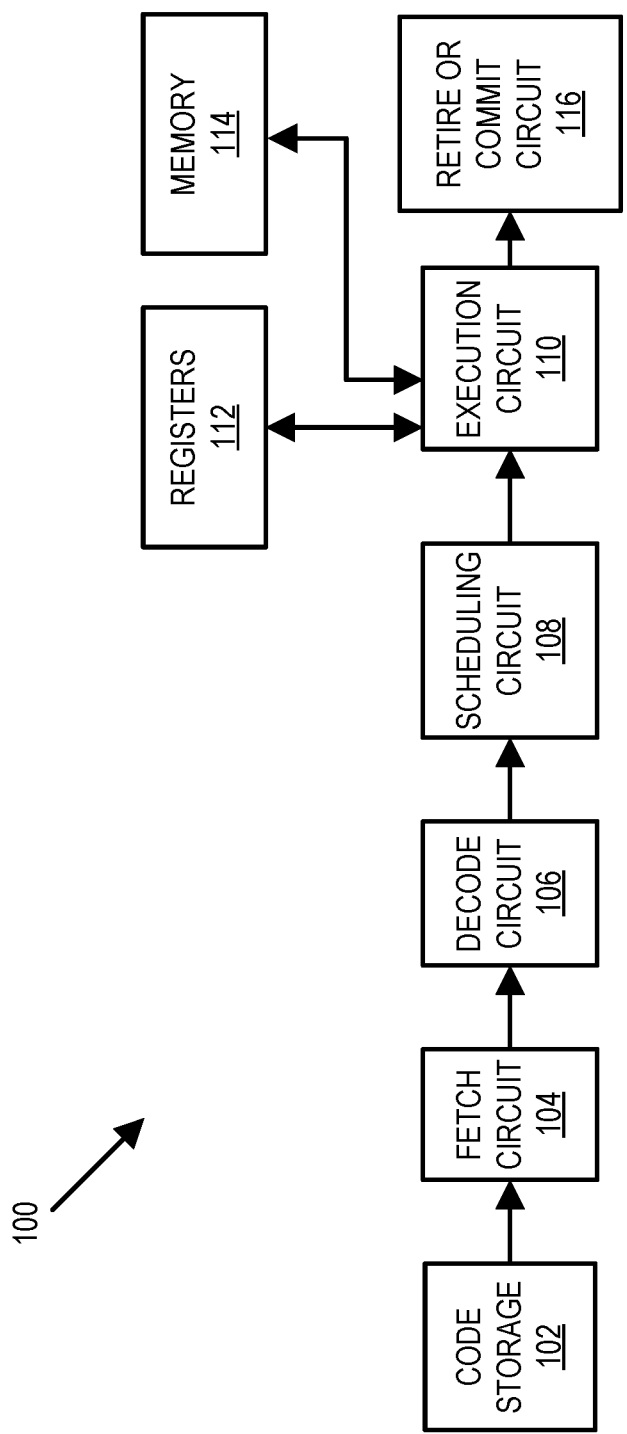
FIG. 1 is a block diagram illustrating processing components for executing instructions for remote atomic operations, according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments disclosed herein pertain to instructions that enable high performance atomic memory operations, even in the context of contended memory locations shared among a plurality of cores in a multicore processor. RAO instructions may be executed in a variety of locations, such as: at the core, at a private cache, at a shared cache, at a cache control circuit (10) (sometimes referred to as a caching and home agent (CHA)), at a memory controller, or at a remote core, to name a few examples. RAO instructions are to be executed on single-socket and multi-socket systems.

Some attempts to execute atomic operations suffer from long latencies, pressure on the capacity of a data cache, and high traffic usage of interconnects among a plurality of cores. For example, as mentioned above, a cache line holding a variable being accessed atomically can get "ping-ponged" among private caches across a shared interconnect (ping-ponging occurs when multiple cores are writing to a same cache line, even if writing to different variables within the cache line, and must pass the cache line back and forth like a ping pong ball). Embodiments disclosed herein enable atomic memory operations with reduced latency and serialization.

Some attempts to execute atomic operations, as also mentioned above, suffer from a coherence overhead that can limit throughput. Even with little contention, some other processors force a certain amount of serialization of atomic operations in a thread. Such serialization limits throughput even if the shared data is uncontended. Embodiments disclosed herein enable atomic memory operations with reduced serialization or throughput limitations.

Some approaches try to avoid using any atomic memory operations due to their poor performance. But avoiding atomic memory operations altogether can be problematic and, besides, often requires significant restructuring of an algorithm, and tends to carry additional instruction overhead.

One approach to avoiding atomic memory operations instead uses privatization: each thread keeps its own copy of a variable. The cost to update a private copy is often low. However, the multiple threads typically eventually need to combine their data, and the overheads to perform this combining can be nontrivial. Further, when an application uses a large array of these shared variables, keeping many copies of the array can place pressure on cache capacity, or even memory capacity. That can drive up the cost of an update of a private copy.

Another approach to avoiding atomic memory operations uses a single cache shared by all processors to prevent data from moving around while multiple updates from different cores are performed. Such a hardware approach, however, is problematic, at least because: (a) it requires that an atomic memory instruction explicitly tell the hardware to perform the instruction at the cache shared by all processors, and (b) it is built on memory models with weak ordering, as opposed to the stronger ordering of other processors.

Another hardware approach allows the processor to determine dynamically whether threads need to serialize through lock-protected critical sections, and to perform serialization only when required. However, such an approach fails to provide good performance under contention, and still incurs serialization around the atomic operation.

Implementing solutions in software may be also problematic because it requires significant changes to the parallelization of applications (and thus programmer effort). Software solutions also carry instruction overheads, which may be even worse than existing atomic memory operations in some cases.

Embodiments described herein allow the latency of atomic memory instructions to be reduced (in the contended case, by queuing operations at a single location and performing them in place). These instructions are referred to as instructions for Remote Atomic Operations (RAO), and the execution of one or more of these instruction causes a specific read-modify-write operation on a memory location, atomically. Further, memory accesses performed by RAO instructions can be weakly ordered yet are built on top of a more strongly-ordered memory model. (As used herein, memory loads and stores in a strongly-ordered model are executed in program order, while a weakly-ordered model allows some reordering of memory accesses, a type of out-of-order execution.) Embodiments disclosed herein thus allow the latency of atomic operations to be hidden (via weak ordering semantics).

FIG. 1 is a block diagram illustrating processing components used to execute instructions for remote atomic operations, according to some embodiments. As shown, computing system 100 includes code storage 102, fetch circuit 104, decode circuit 106, scheduling circuit 108, execution circuit 110, registers 112, memory 114, and retire or commit circuit 116. In operation, fetch circuit 104 fetches an instruction from code storage 102, which may comprise a cache memory, an on-chip memory, a memory on the same die as the processor, an instruction register, a general register, or system memory, without limitation. In some embodiments, the instruction has a format similar to that of instruction formats illustrated and discussed with respect to any one or more of FIGS. 7-10. After the fetch circuit fetches the instruction, decode circuit 106 decodes the fetched instruction, including by parsing an opcode and various fields of the instruction. After decode circuit 106 decodes the instruction, scheduling circuit 108 selects an execution circuit among multiple circuits in the computing system to execute the decoded instruction. The selected execution circuit 110 then executes the decoded instruction. In executing the instruction, execution circuit 110 may read data from and write data to registers 112 and memory 114. Registers 112 may include a data register, an instruction register, a vector register, a mask register, a general purpose register, an on-chip memory, a memory on the same die as the processor, or a memory in the same package as the processor, without limitation. Memory 114 may be an on-chip memory, a memory on the same die as the processor, a memory in the same package as the processor, a cache memory, or system memory, without limitation. After the execution circuit 110 executes the instruction, in some embodiments, a retire or commit circuit 116 retires the instruction, ensuring that execution results are written to or have been written to their destinations, and freeing up or releasing resources for later use.

Embodiments disclosed herein provide a family of atomic memory instructions. Each of the executed atomic memory instructions detailed herein performs an atomic update operation (e.g., read-modify-write) on a memory location. The memory accesses are weakly ordered with respect to other instructions from the same thread, and are similar to non-temporal (NT) stores. While such memory accesses are weakly ordered to improve performance, some embodiments could permit stronger forms of ordering. The instructions do, however, avoid traditional data hazards—read-after-write, write-after-read and write-after-write dependencies—with instructions from the same thread. The instructions may be executed in a variety of locations, such as: at the processor core, at a private cache, at a shared cache, at a cache control circuit (10) (sometimes referred to as a caching and home agent (CHA)), at a memory controller, or at a remote core. In some embodiments, each instruction is to perform parallel operations on elements of a vector register. In some embodiments, a scalar operation is performed on a general purpose register.

Figure 2:
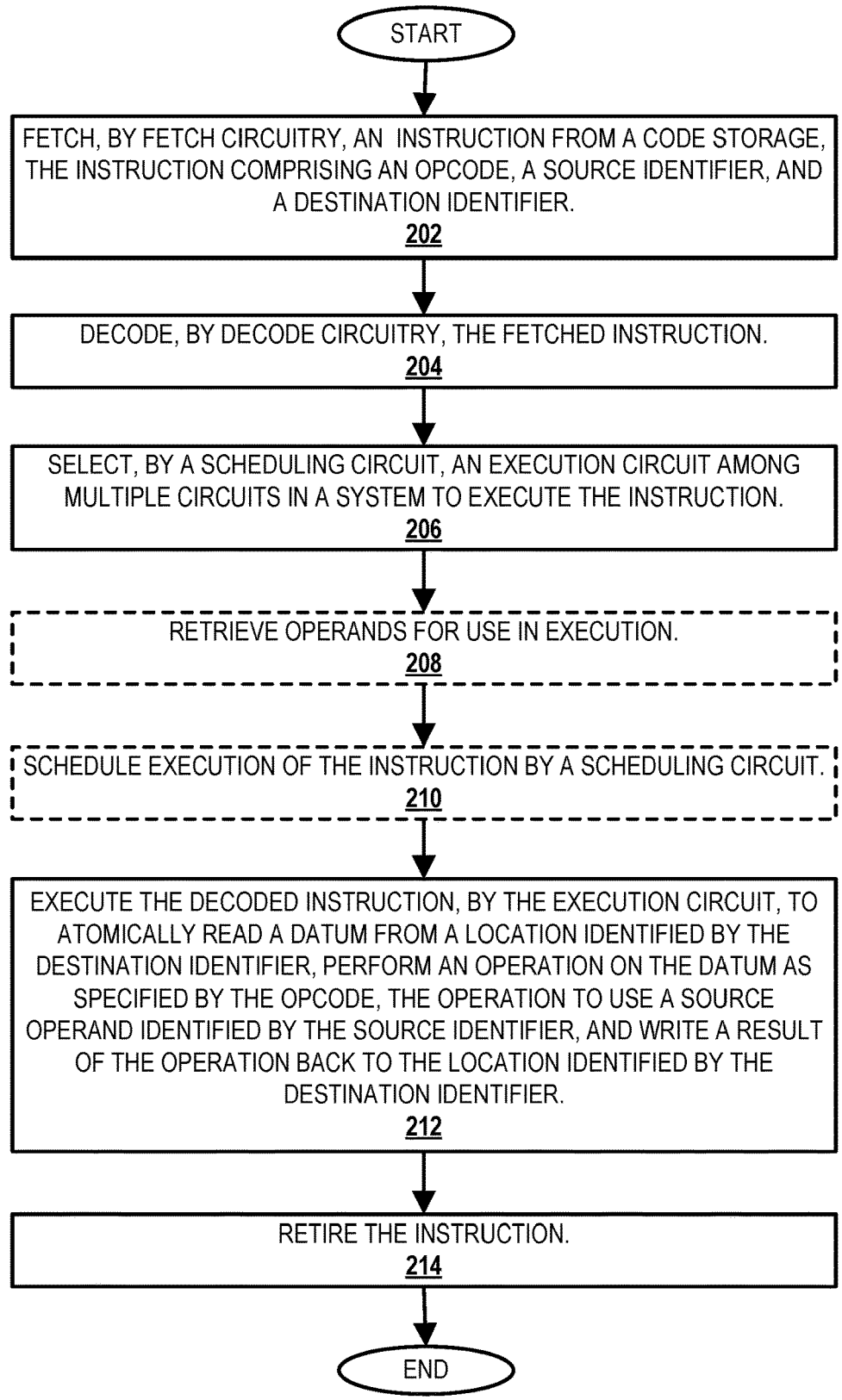
FIG. 2 is a flow diagram of a process to be performed by a processor to execute an instruction for a remote atomic operation, according to some embodiments.

FIG. 2 is a flow diagram of a process to be performed by a processor to execute an instruction for a remote atomic operation, according to some embodiments. As shown, after starting, at 202 a fetch circuit fetches an instruction from a code storage, the instruction including an opcode, a source identifier, and a destination identifier. In some embodiments, the instruction includes a second destination identifier. In some embodiments, the instruction includes an immediate (constant value). At 204, the fetched instruction is decoded by a decode circuit.

At 206, a scheduling circuit selects an execution circuit among multiple circuits in a system to execute the instruction, since disclosed embodiments may perform the instruction in a wide variety of system locations. Relatedly, FIG. 5 and FIG. 6 and their associated descriptions below, in the section under the sub-heading, "Where RAO Instructions are Executed," describe a variety of potential execution locations.

In some embodiments, at least one of the multiple circuits in the system generates heuristics indicating a measured power and performance state, and the scheduling circuit uses the generated heuristics to inform its selection of the execution circuit.

At 208, operands to be used in executing the instruction are retrieved from their register or memory locations. FIG. 2 uses dashed lines to illustrate 208 to indicate that it is optional, at least insofar as when it is performed. In some embodiments, for example, retrieving operands is part of decoding the instruction at 204. In some embodiments, retrieving operands is part of scheduling the instruction, and is performed by the scheduling circuit. In some embodiments, retrieving operands is part of executing the instruction at 212, and is performed by the execution circuitry.

At 210, the scheduling circuit schedules execution of the decoded instruction out-of-order with respect to other instructions. FIG. 2 uses dashed lines to illustrate 210 to indicate that it is optional to the extent that the scheduling function can be performed by decode circuitry, execution circuitry, rename/allocate circuitry, and/or retirement circuitry, as illustrated and described with respect to FIGS. 4, 12A, and 12B.

The scheduling circuit schedules execution of the decoded instruction with an order selected to optimize at least one of latency, throughput, power, and performance. For example, memory accesses to sequential memory addresses can be grouped to allow them to execute as bursts, rather than sequentially, thereby improving throughput, power, and performance. To improve latency, for another example, memory load instructions can be moved to execute much earlier than when the loaded data is needed, thereby hiding some of the latency associated with the load. As another example of optimizing power and performance, memory store instructions can be moved to first execute those whose operands are ready ahead of those waiting for operands to be ready. As another example of optimizing power, memory accesses to DRAM memory can be sorted to group accesses to a same DRAM bank, thereby minimizing the number of DRAM bank precharges required.

At 214, the instruction is retired, writing execution results to their destinations, and freeing up resources for use by subsequent instructions.

In some embodiments, the executing at 212 comprises atomically reading a datum from a location identified by the destination identifier, performing an operation on the datum as specified by the opcode, the operation to use a source operand identified by the source identifier, and writing a result of the operation to the location identified by the destination identifier. These embodiments thus use the destination both as a source and as a destination.

In some embodiments, the executing at 212 comprises atomically reading a datum from a location identified by the destination identifier, performing an operation on the datum as specified by the opcode, the operation ignoring the source operand identified by the source identifier, and writing a result of the operation to the location identified by the destination identifier. These embodiments thus use the destination as both a source and a destination, and ignore the source.

In some embodiments, the executing as 212 comprises atomically reading a datum from a location identified by the destination identifier, performing an operation on the datum as specified by the opcode, the operation ignoring at least part of the datum retrieved from the destination (e.g., using a mask register to mask certain elements of a vector retrieved from the destination), using the source operand identified by the source identifier, and writing a result of the operation to the location identified by the destination identifier. These embodiments thus use the source and ignore at least part of the destination.

In some embodiments, the executing at 212 comprises atomically reading a datum from a location identified by the destination identifier, performing an operation on the datum as specified by the opcode, the operation ignoring at least part of the datum retrieved from the destination (e.g., ignoring certain elements of a vector retrieved from the destination), and ignoring the source operand identified by the source identifier, and writing a result of the operation to the location identified by the destination identifier. These embodiments thus ignore at least part of the destination and ignore the source.

The instruction can operate on vector or scalar data, as controlled by the opcode. In some embodiments, the instructions are part of a strongly ordered set of instructions. In some embodiments, the fetch circuitry, decode circuitry, and execution circuit fetch, decode, and execute a plurality of strongly ordered instructions in-order according to a more strongly ordered memory model.

Figure 3:
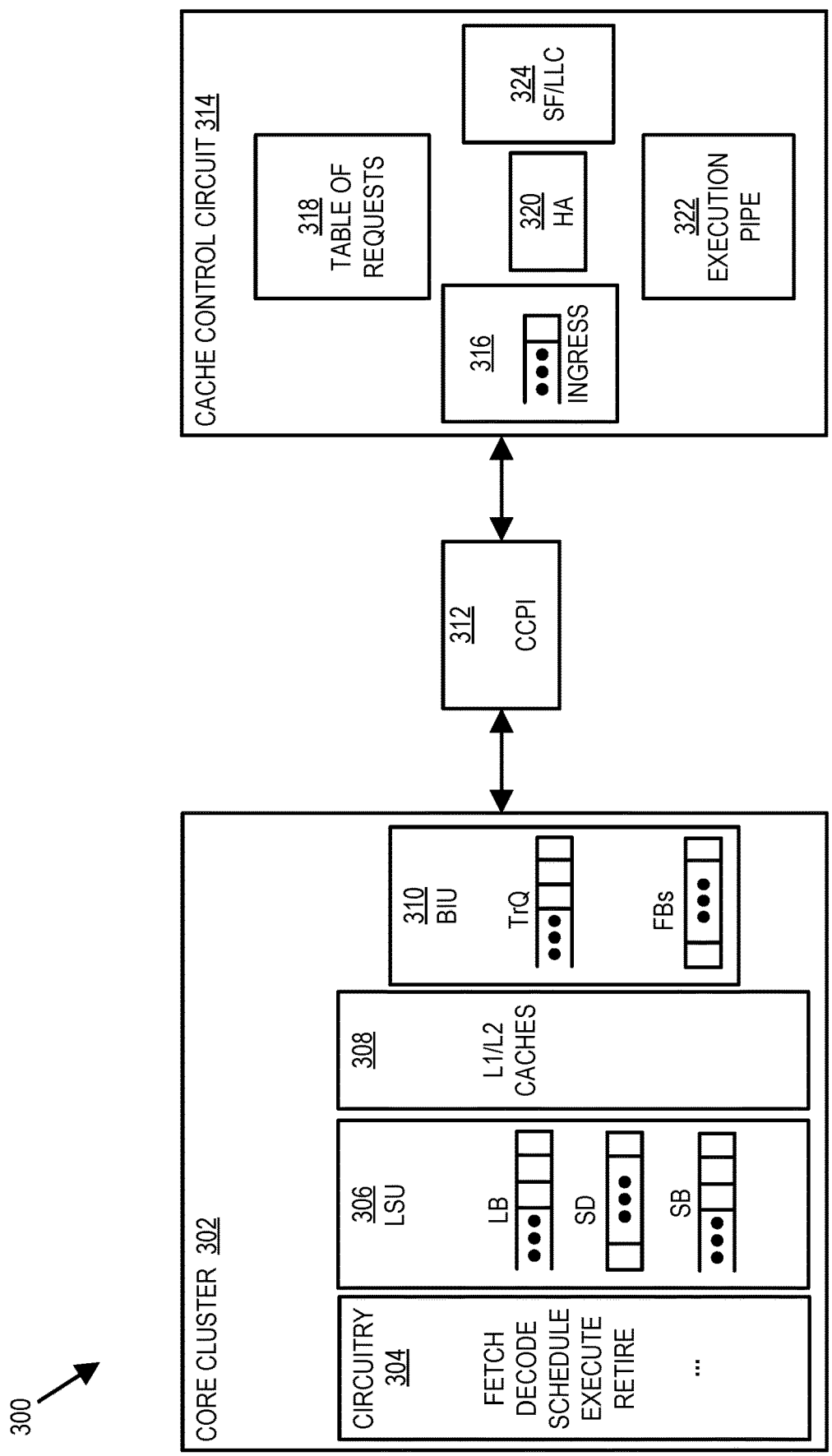
FIG. 3 illustrates portions of a multi-core processor that are used for executing instructions for remote atomic operations, according to some embodiments.

FIG. 3 is a block diagram illustrating portions of a multi-core processor to perform RAO instructions, according to some embodiments. As shown, multicore processor 300 includes core cluster 302, cache coherent protocol interface (CCPI) 312, and cache control circuit 314. Cache coherent protocol interface (CCPI) 312 couples core cluster 302 to cache control circuit 314. Also shown are snoop filter/last level cache (SF/LLC) 324, which are to be used by cache control circuit 314 in order to service RAO instructions. In some embodiments, cache control circuit 314 is referred to as a caching and home agent (CHA).

Core cluster 302, according to the embodiment of FIG. 3, includes circuitry 304, which includes at least parts of a processor pipeline to be used in executing instructions for remote atomic operations, according to some embodiments disclosed herein. Circuitry 304 can be used, for example, to implement the processes illustrated in any of FIG. 2, FIG. 4, FIG. 9, and FIG. 11. Namely, circuitry 304 includes a fetch stage to fetch an instruction from a code storage, a decode stage to decode the instruction, a schedule stage to schedule execution, an execute stage to perform an operation specified by the instruction, and a retire stage to retire the instruction.

In some embodiments, the decode stage of circuitry 304 decodes each instruction into one or more micro-operations (uOps), and stores them in a uop queue. In some embodiments, the scheduling stage causes retrieval of operands needed by the uOps while the uOps are maintains in the uop queue. In some embodiments, instructions enter the scheduling stage in program order, but the scheduling stage selects uOps out of order to send to the execution. The scheduling circuit in such embodiments bases its selection on an attempt to improve at least one of latency, throughput, power, and performance.

In some embodiments, the execute stage of circuitry 304 utilizes at least three execution stacks, each stack encapsulating a certain type of data and including one or more of an arithmetic logic unit (ALU), a shifter, and a memory request generator. In some embodiments, for example, different stacks are used for integer data, floating point data, and blended integer and floating point simultaneous instruction multiple data (SIMD) data.

In some embodiments, the execute stage of circuitry 304 provides multiple ports to which the scheduling circuit issues uOps. For example, in some embodiments, the execute stage provides five ports, to which uOps can be scheduled simultaneously. Accordingly, in some embodiments, the execute stage can execute uOps associated with multiple threads simultaneously. In some embodiments, the execute stage can receive and processes uOps associated with more than one logical processor simultaneously.

In some embodiments, core cluster 302 includes load/store unit (LSU) 306. As shown, LSU 306 includes buffers—a load buffer (LB), a store data buffer (SD), and a store buffer (SB)—to hold data transfers between circuitry 304 and L1/L2 caches 308. In some embodiments, each of the entries of the LB, SD, and SB buffers is 64 bytes wide.

As shown, core cluster 302 includes L1/L2 caches 308. A cache hierarchy in core cluster 302 contains a first level instruction cache (L1 ICache), a first level data cache (L1 DCache) and a second level (L2) cache. When circuitry 304 implements multiple logical processors, they share the L1 DCache. The L2 cache is shared by instructions and data. In some embodiments, the L1 data and instruction caches each have a capacity of 32 kB, are 8-way set associative, and have a cache line size of 64 bytes. In some embodiments, the L1 and L2 data caches are non-blocking, so can handle multiple simultaneous cache misses.

As shown, core cluster 302 includes bus interface unit (BIU) 310, which, in operation, handles transfer of data and addresses by sending out addresses, fetching instructions from a code storage, reading data from ports and memory, and writing data to ports and memory.

Cache coherent protocol interface (CCPI) 312, according to the embodiment of FIG. 3, provides a bidirectional datapath between the core cluster 302 and the cache control circuit 314.

Cache control circuit 314, as shown, includes ingress 316, table of requests 318, snoop filter/last level cache (SF/LLC) 324, execution pipe 322, and home agent 320. Ingress 316 communicates with and buffers transaction to and from the cache coherent protocol interface (CCPI) 312. Table of requests 318, in some embodiments, includes registers or static random access memory to maintain up to 64 memory requests and their progression. SF/LLC 324 in some embodiments includes a snoop filter used to respond to snoop requests from other core clusters, as well as a last level cache that is inclusive of the content of lower level caches in core cluster 302. In other words, in some embodiments, any cache line that is valid in the L1/L2 caches 308 is also present in the last level cache. Execution pipe 322 in some embodiments enhances read-modify-write functionality by providing additional integer arithmetic with reduced latency. In some embodiments, for example, table of requests 318 maintains a destination address and an immediate (constant value) to be added to the value, the sum then to be written back to the destination address.

Figure 4:
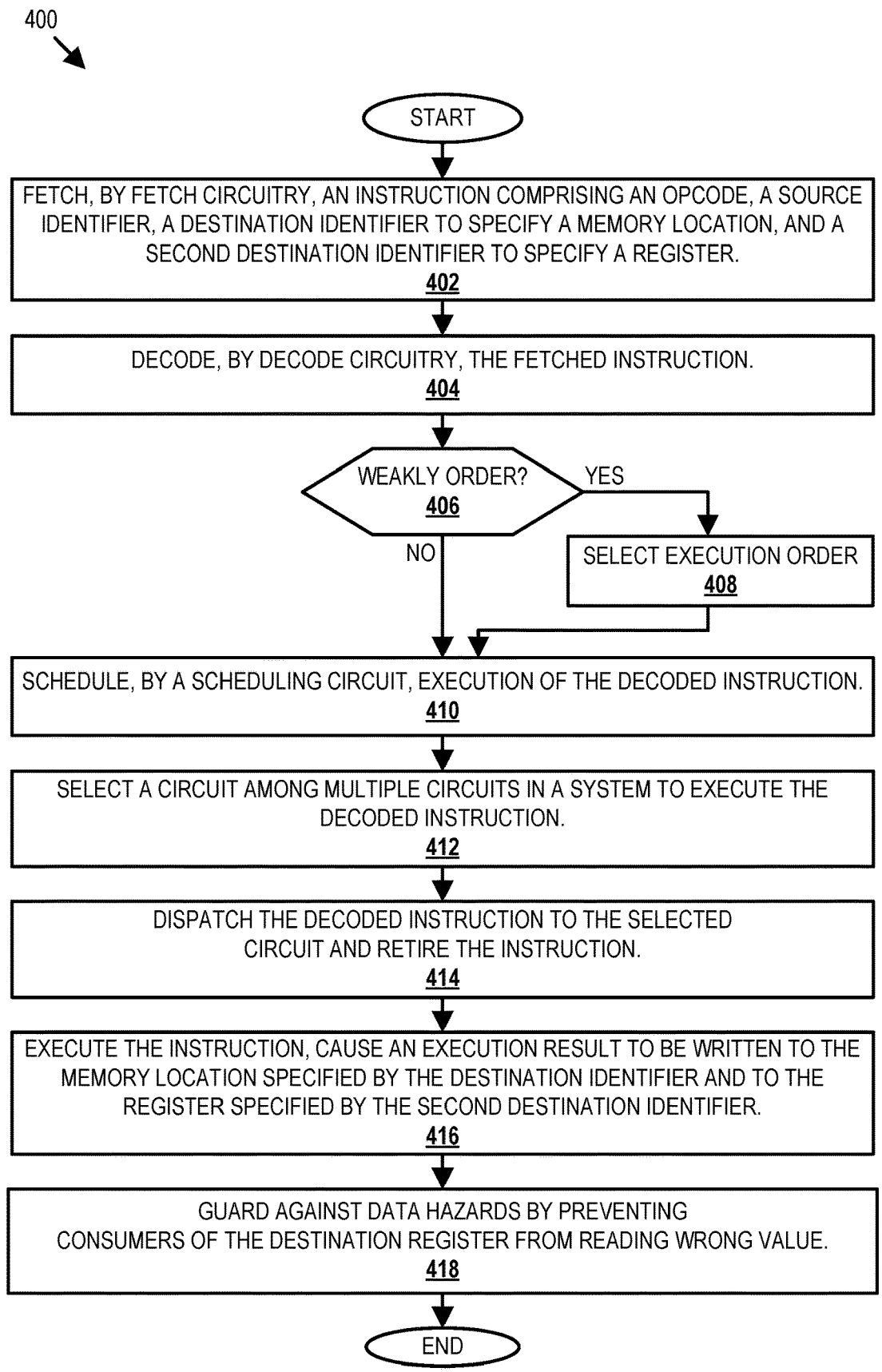
FIG. 4 is a flow diagram of a process performed by a processor to execute an instruction for a remote atomic operation, according to some embodiments.

FIG. 4 is a flow diagram of a process performed by a processor to execute an instruction for a remote atomic operation, according to some embodiments. Process 400 is executed using, for example, circuitry 304 as shown in FIG. 3. After starting, at 402 an instruction is fetched from a code storage by fetch circuitry. The fetched instruction includes an opcode, a source identifier, a destination identifier to specify a memory location, and a second destination identifier to specify a register. At 404, the fetched instruction is decoded by decode circuitry.

At 406, it is determined whether the instruction is to be weakly ordered. In some embodiments, this determination is made by a scheduling circuit. In some embodiments, for example, the scheduling circuit accesses a page table having a plurality of entries, each entry storing a mapping between a virtual address and a physical address for an associated memory page, each entry further specifying whether to weakly order remote atomic operations to the associated memory page. In some embodiments, RAO instructions themselves specify, by way of an opcode, an opcode suffix, or an additional instruction operand, whether they are to be weakly ordered or strongly ordered. Some RAO instructions may be allowed to be weakly ordered, while other RAO instructions are to be strongly ordered.

If the instruction is to be weakly ordered, the scheduling circuit at 408 selects an execution order for the decoded instruction, the order being selected to optimize at least one of latency, throughput, power, and performance. For example, memory accesses to sequential memory addresses can be grouped to allow them to execute as bursts, rather than sequentially, thereby improving throughput, power, and performance. To improve latency, for another example, memory load instructions can be moved to execute much earlier than when the loaded data is needed, thereby hiding some of the latency associated with the load. As another example of optimizing power and performance, memory store instructions can be scheduled to give preference to those whose operands are ready ahead of those waiting for operands to be ready. As another example of optimizing power, memory accesses to DRAM memory can be sorted to group accesses to a same DRAM bank, thereby minimizing the number of DRAM bank precharges required.

At 410, the scheduling circuit schedules execution of the RAO instruction either with strong ordering, or according to the order selected at 408.

At 412, the scheduling circuit selects a circuit within a system, to execute the decoded instruction, since disclosed embodiments may perform the instruction in a wide variety of system locations. Relatedly, FIG. 5 and FIG. 6 and their associated descriptions below, in the section under the heading, "Where RAO Instructions are Executed," describe a variety of potential execution locations.

In some embodiments, the instruction decoded at 404 includes a hint to suggest which of the multiple circuits is to execute the decoded instruction, wherein the hint comprises at least one of an opcode prefix, an opcode suffix, an immediate, and a register identifier to identify a register. For example, the instruction may contain a "CORE" prefix or suffix, hinting that the instruction should be executed in the processor core. For example, the instruction may contain a "REMOTE" prefix or suffix, hinting that the instruction should be executed in a remote processing core. For example, the instruction may contain a "PROX" prefix or suffix, hinting that the instruction should be executed by a circuit proximate to a location where the destination data is expected to be found, such as, for instance, a private cache of a core executing a thread associated with the RAO instruction.

At 414, the scheduling circuit dispatches the decoded instruction to the selected execution circuitry, and retires the instruction, thereby hiding subsequent latency associated with the write.

At 416, the selected execution circuit executes the instruction, and causes an execution result to be written back to the memory location specified by the destination identifier and to the register specified by the second destination identifier. In some embodiments, the selected execution circuit uses a writeback circuit, such as write back/memory write stage 1418 (FIG. 14A), to write the execution result. In some embodiments, the selected execution circuit uses a memory controller, such as memory unit 1470 and/or memory access unit(s) 1464 (FIGS. 14A, B), to write the execution result back to the memory location specified by the destination identifier. In some embodiments, the selected execution circuit uses a register allocation circuit, such as rename/allocator unit 1452 (FIG. 14B) to write the execution result to the specified register.

At 418, the processor guards against data hazards by preventing consumers of the identified destination register from reading a wrong value. In some embodiments, a cache control circuit, such as cache control circuit 314 (FIG. 3) guards against data hazards by maintaining a table of requests that have been retired but not yet committed, for example table of requests 318 (FIG. 3), and checking for hazards among subsequent accesses to the same cache line or cache element that is awaiting commission. In some embodiments, multiple circuits within the processor, including at least two of the scheduling circuit, the rename/allocator unit 1452 (FIG. 14B), the memory unit 1470 (FIG. 14B), the memory access unit(s) 1464 (FIG. 14B), the L2 cache unit 1476 (FIG. 14B), the decode unit 1440 (FIG. 14B).

The process then ends.

Where RAO Operations are Executed

Instructions for remote atomic operations, as defined in various embodiments herein, may be performed in a variety of locations in the processor, such as: at one or more of the cores of a multiprocessor, at a private cache, at a shared cache, at a cache control circuitry (sometimes referred to as a or caching and home agent (CHA)), at the memory controller, at a remote core, on a coprocessor, or at an accelerator. RAO instructions are for both single-socket and multi-socket systems.

Figure 5:
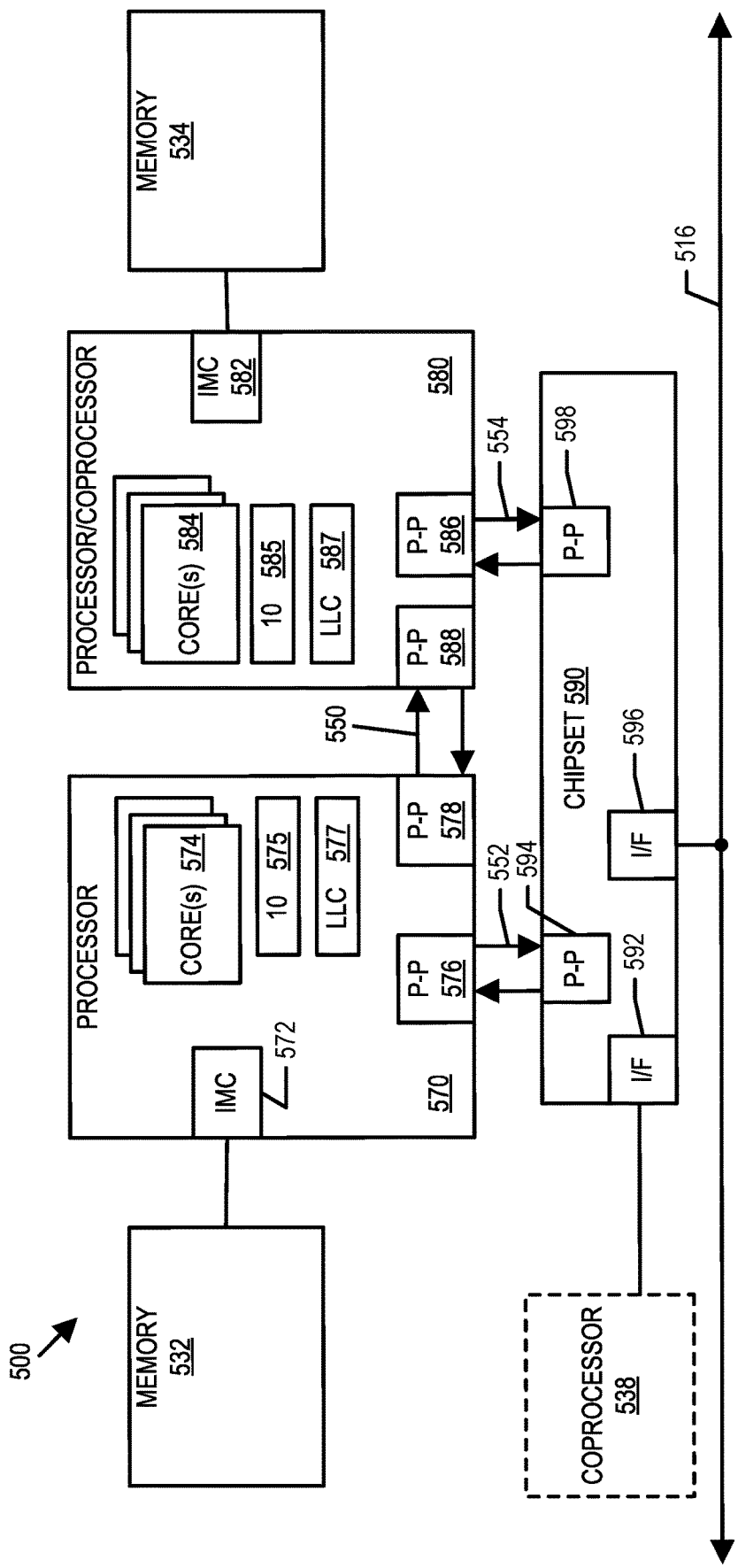
FIG. 5 is a block diagram of a second more specific exemplary system for executing instructions for remote atomic operations, according to some embodiments.

FIG. 5 is a block diagram of an exemplary system for executing instructions for remote atomic operations, according to some embodiments. As shown, system 500 includes processors 570 and 580, which include integrated memory controllers ("IMC") 572 and 582, respectively, to connect to memory 532 and memory 534, respectively. Processor 570 and processor 580 each include one or more processor cores 574 and 584, cache control circuits (10) 575 and 585, last level caches (LLC) 577 and 587, point-to-point interfaces 576, 578, 586, and 588, coupled to other components using interconnects 550, 552, and 554. System 500 further includes chipset 590, which includes point-to-point interfaces 594 and 598 and hi-performance interfaces 592 and 596 to communicate with bus 516 and optional coprocessor 538. Cache control circuits 575 and 585 are sometimes referred to as caching and home agents (CHA).

In some embodiments, the location where the instruction for a remote atomic operation is to be executed is selected, for example, during process 400 at block 412 (FIG. 4).

In some embodiments, the execution circuit selected at 408 is to reflect a static selection, for example, the system 500 as designed by a hardware designer. Each of the processor cores 574 and 584 can be associated with a cache control circuit (10), which is to execute the instruction for a remote atomic operation.

In other words, in some embodiments, the location where the instruction for the remote atomic operation is to be executed is to be chosen statically, by the hardware designer—e.g., a hashing algorithm that maps an address to a cache control circuit (10).

In some embodiments, the location where the instruction for the remote atomic operation is to be executed is to be chosen statically, by software.

In some embodiments, the location where the instruction for the remote atomic operation is to be executed is to be chosen statically as controlled by each instruction by, for example, including an immediate operand to indicate where to execute the instruction.

In some embodiments, the processor is to include a software programmable control register to be set by software to indicate where RAO instructions should be executed.

In some embodiments, the processor is to include separate software programmable control registers to be set by software for different instructions (e.g., ADD and CMPXCHG) or different groups of instructions (e.g., integer and floating point) to indicate where the RAO instruction is to be executed.

In some embodiments, the processor is to include separate software programmable control registers for each different type of instruction or group of instructions, the control registers to be set by software to indicate where the RAO instruction is to be executed.

In some embodiments, the processor is to have separate controls for different instructions or groups of instructions.

In some embodiments, the processor is to use some information from hardware to predict the best location to execute a RAO instruction. In such embodiments, the processor is to use both the information received from the hardware and the controls provided by software (e.g. as part of the instruction, as a control register, or as part of a page table entry) to determine where to execute the RAO instruction. In such embodiments, the controls provided by the software are more like a hint than they are a directive.

In some embodiments, a property is to be added to addresses (e.g., in the page table entry) indicating where RAO instructions should be executed on those addresses.

Figure 6:
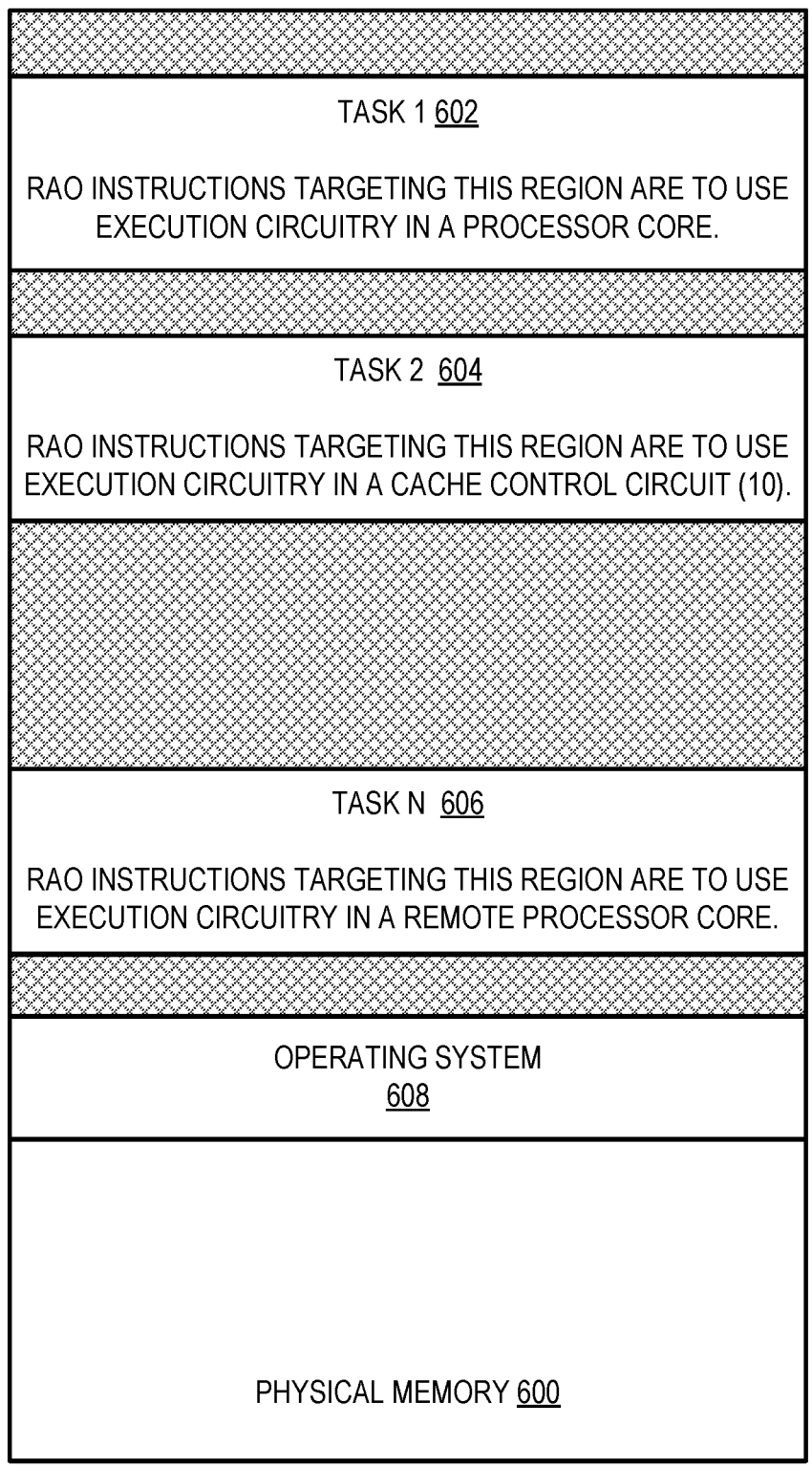
FIG. 6 illustrates a physical memory having various memory regions being mapped to execute RAO instructions at various locations, according to some embodiments.

FIG. 6 illustrates a physical memory having various memory regions being mapped to execute RAO instructions at various locations, according to some embodiments. As shown, physical memory 600 includes code and storage regions for task 1 602, task 2 604, task N 606, and a region for the operating system 608. In some embodiments, RAO instructions directed to memory addresses for each of the tasks 1-N are to use different hardware to execute the RAO instructions. As shown, RAO instructions having a destination identifier pointing to a memory address in the region of task 1 602 are to use execution circuitry in a processor core, for example one of the processor cores 574 in FIG. 5; those pointing to the region of task 2 604 are to use execution circuitry in a cache control circuit, for example, 10 575 in FIG. 5; and those pointing to task N 606 are to use execution circuitry in a remote processor core, such as optional coprocessor 538 in FIG. 5. The mapping of each memory region to an execution circuit location can be achieved by adding a page table entry specifying where RAO instructions directed to that region are to be executed.

In some embodiments, performance metrics are gathered and used to dynamically select where to execute RAO instructions. For example, queue depths in a cache control circuit's transaction ordering structure can be used to direct RAO instructions to be executed by more lightly-loaded cache control circuitry (sometimes referred to as a caching and home agent). As another example, traffic statistics collected by, for example, cache coherent protocol interface (CCPI) 312 in FIG. 3, can be used to direct RAO instructions to be executed by more lightly-loaded network nodes. As another example, at least a few actual latencies can be measured, and RAO instructions that experience more than a threshold amount of latency are to be assigned to random execution circuits to improve latencies on a trial-and-error basis. As another example, RAO instructions emanating from an application are to be assigned for execution to a processing core executing that application. Such a mapping can be effectuated by adding the mapping to a page table for a memory region used by the application.

RAO Instruction Types

In some embodiments, executing the instruction is to involve a read-modify-write, whereby the processor reads the contents of a memory location, modifies the data that was read, and writes the result back to the memory location. Optional parameters can serve to modify the operation that is performed during the modify stage.

There are at least two different classes of RAO instructions: those whose only output is the memory location that is atomically updated, and those that also have a destination register. There are microarchitectural implications of this difference. Under each class, there are sub-classes of RAO instructions.

RAO instructions whose only output is the memory location that is atomically updated can be weakly ordered; due to the weak ordering, such an RAO instruction is retired as soon as the operation is issued to the memory system, without waiting for the operation to complete. Instructions with a register destination, on the other hand, retire after the core receives the data. For this reason, in some embodiments, instructions with a register destination have stronger ordering requirements than the first class of RAO instructions.

All RAO instructions take a memory destination and a general purpose register operand. Some additionally take an extra, implicit operand (e.g., in RAX). The below tables describe some RAO instructions, with optional second destination and immediate (constant value).

TABLE 1

| No Register Destination (i.e., Opcode memdest, reg) | | |
| --- | --- | --- |
| Opcode | Operands | Description |
| RAO_ADD | memdest, reg, [immediate] | Remote Atomic Operation: integer addition (FP Also) Read [memdest]; add reg; write result to [memdest] Optionally, write result to [2nd destination] also. Optionally, add immediate to result also. |
| RAO_SUB | memdest, reg, [immediate] | Remote Atomic Operation: integer subtraction; FP Also Read [memdest]; subtract reg; write result to [memdest] Optionally, write result to [2nd destination] also. Optionally, subtract immediate from result also. |
| RAO_ADD_SAT | memdest, reg, [immediate] | Remote Atomic Operation: integer saturating addition Read [memdest]; Add reg w/saturation; write sum to [memdest] Optionally, add immediate to result with saturation also. |
| RAO_SUB_FLR | memdest, reg, [immediate] | Remote Atomic Operation: integer subtraction with floor Read [memdest]; subtract reg w/floor; write result to [memdest] Optionally, subtract immediate with floor from result also. |
| RAO_AND | memdest, reg, [immediate] | Remote Atomic Operation: logical AND Read [memdest]; logical AND with reg; write to [memdest] Optionally, bitwise AND immediate with result also. |
| RAO_OR | memdest, reg, [immediate] | Remote Atomic Operation: logical OR Read [memdest]; logical OR with reg; write to [memdest Optionally, bitwise OR immediate with result also. |
| RAO_XOR | memdest, reg, [immediate] | Remote Atomic Operation: logical XOR Read [memdest]; logical XOR with reg; write to [memdest] Optionally, XOR immediate with result also. |
| RAO_FP_ADD | memdest, reg, [immediate] | Remote Atomic Operation: floating point addition Read [memdest]; add reg; write sum to [memdest] Optionally, add immediate to result also. |

TABLE 1-continued

No Register Destination (i.e., Opcode memdest, reg)

| Opcode | Operands | Description |
|---|---|---|
| RAO_FP_SUB | memdest, reg, [immediate] | Remote Atomic Operation: floating point subtraction<br>Read [memdest]; subtract reg; write result to [memdest]<br>Optionally, subtract immediate from result also. |
| RAO_MIN | memdest, reg | Remote Atomic Operation: update to minimum<br>Write reg to [memdest]if reg is less than [memdest] |
| RAO_MAX | memdest, reg | Remote Atomic Operation: update to maximum<br>Write reg to [memdest]if reg is greater than [memdest] |

In some embodiments, the instructions for remote atomic operations update a memory location, and also write a result to a register.

TABLE 2

Remote Atomic Operation (RAO) Instructions with Register Destination
(i.e., Opcode Memory Destination, [Register Destination], [Register])

| Opcode | Operands | Description |
|---|---|---|
| RAO_ADD_SAT | Memdest, reg, [second dest] [immediate] | Remote Atomic Operation: integer saturating addition<br>Read [memdest]; Add reg w/saturation; write sum to [memdest]<br>Optionally, write result to [2nd destination] also.<br>Optionally, add immediate to result with saturation also. |
| RAO_SUB_THR | Memdest, reg, [second dest] [immediate] | Remote Atomic Operation: integer subtraction with threshold<br>Subtract reg from [Memdest]; write result to [Memdest]<br>In an embodiment, set most significant bit if threshold reached<br>In an embodiment, set a processor flag bit if threshold reached |
| RAO_XADD | Memdest, reg, [second dest] [immediate] | Remote Atomic Operation integer exchange and add<br>Exchange [memdest] with reg, write sum of both to [memdest]<br>Optionally write sum to second dest also;<br>Optionally add immediate to sum |
| RAO_XCHG | Memdest, reg, [second dest] | Remote Atomic Operation: Exchange<br>Exchange [memdest] with reg.<br>Optionally, exchange [memdest] with second [second dest] also. |
| RAO_CMPXCHG | Memdest, reg, [second dest] | Remote Atomic Operation: compare and exchange;<br>If [memdest] equals processor's EAX architectural register, write reg to [memdest]; otherwise, write [memdest] to EAX.<br>Optionally write result to second dest. |
| RAO_FP_XADD | Memdest, reg, [second dest] [immediate] | Remote Atomic Operation: floating point exchange and add<br>Exchange [memdest] with reg, load sum of the two in [memdest]<br>Optionally write to second dest; optionally add immediate to sum |
| RAO_XMIN | memdest, reg, [second dest] | Remote Atomic Operation: update to minimum<br>Write reg to [memdest]if reg is less than [memdest]<br>Optionally also write result to [2nd destination] |
| RAO_XMAX | Memdest, reg, [second dest] | Remote Atomic Operation: update to maximum<br>Write reg to [memdest]if reg is greater than [memdest]<br>Optionally also write result to [2nd destination] |

In some embodiments, the instruction for the remote atomic operation is one of integer addition, integer addition with threshold, integer subtraction, integer subtraction with threshold, integer saturating addition, integer subtraction with floor, logical AND, logical OR, logical XOR, floating point addition, floating point subtraction, update to minimum, and update to maximum, integer exchange and add, exchange, compare and exchange, floating point exchange and add.

RAO Instruction Formats

The formats for RAO instructions according to embodiments disclosed herein are illustrated and described with reference to FIGS. 7-10.

Figure 7:
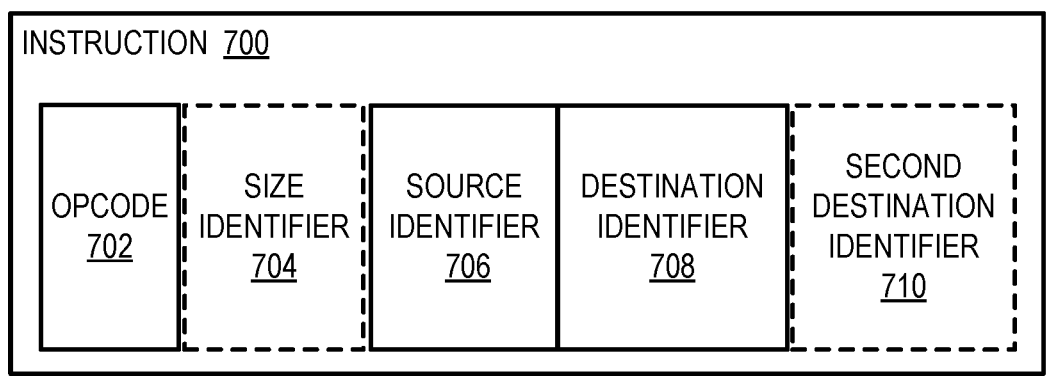
FIG. 7 is a block diagram illustrating a format for instructions for remote atomic operations, according to some embodiments.

FIG. 7 is a block diagram illustrating a format for instructions for remote atomic operations, according to some embodiments. As shown, instruction 700 includes opcode 702, optional size identifier 704, source identifier 706, destination identifier 708, and an optional second destination identifier 710 (optional instruction fields are shown in boxes with dashed outlines).

Figure 8:
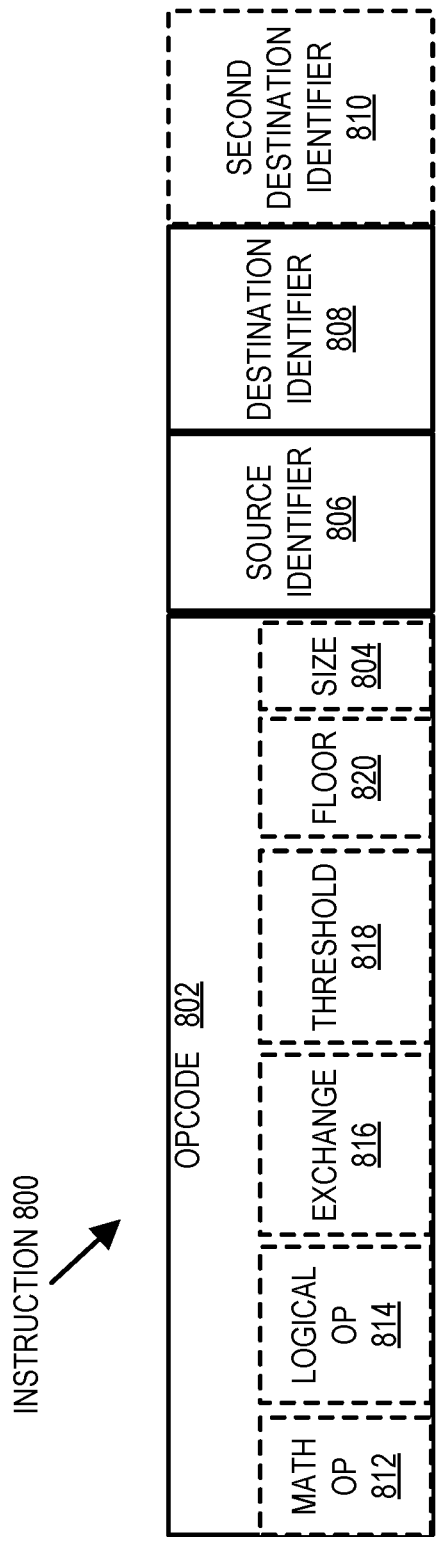
FIG. 8 is a block diagram illustrating a format and optional parameters for instructions for remote atomic operations, according to some embodiments.

Optional size identifier 704 is shown as a separate instruction operand, but in some embodiments, it is to be included in an opcode, prefix or suffix, "B," "W," "D," and "Q," corresponding to a size-1 byte, 2 bytes, 4 bytes, or 8 bytes, respectively—of each source vector element. In some embodiments, optional size identifier 704 is included in the opcode, such as a prefix or suffix, "H," "S," "D," "Q," and "E," corresponding to precision levels—Half precision (2 bytes), Single precision (4 bytes), Double precision (8 bytes), and Quadruple precision (16 bytes), respectively—of each source vector element. In other embodiments, optional size identifier 704 is an instruction parameter or operand specifying the source vector element's size and/or precision level. FIG. 8 illustrates the size identifier as part of the opcode.

Figure 11:
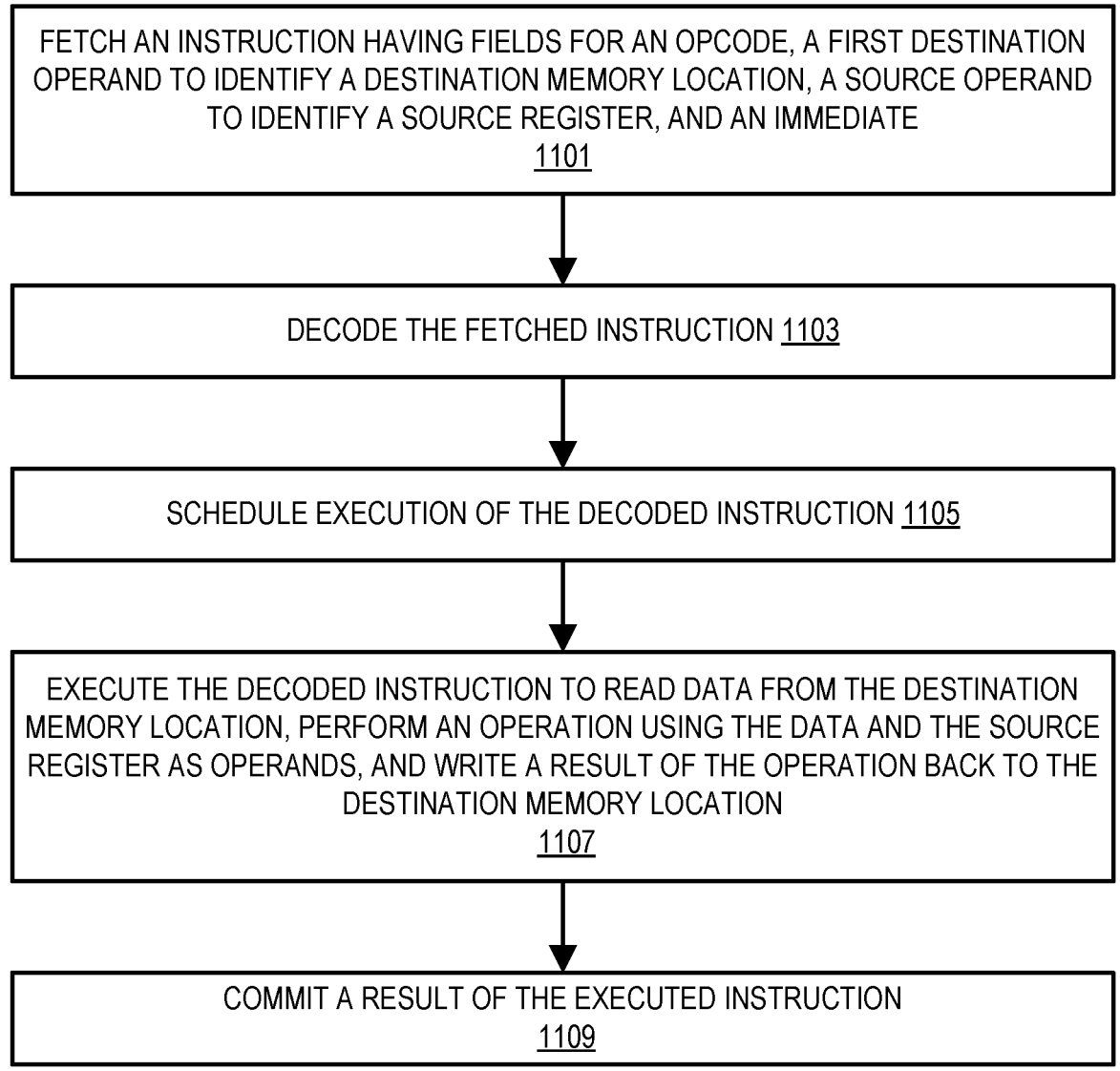
FIG. 11 illustrates a process of executing a RAO instruction by a processor.

Source identifier 706, in some embodiments, is to specify a source vector register, such as the vector registers included in a processor's register file. FIG. 11 and its associated description further below describe an embodiment of a processor's register file. In some embodiments, source identifier 706 is to identify a memory location.

Destination identifier 708 and optional second destination identifier 710 identify two locations—either vector registers of the processor's register file or memory locations—to which to write execution results according to some embodiments disclosed herein.

FIG. 8 is a block diagram illustrating a format and optional parameters for instructions for remote atomic operations, according to some embodiments. As shown, instruction 800 includes opcode 802, optional size identifier 804, source identifier 806, destination identifier 808, and optional second destination identifier 810.

Optional size identifier 804, in some embodiments, is included in the opcode, for example, as a prefix or suffix, "B," "W," "D," and "Q," corresponding to a size-1 byte, 2 bytes, 4 bytes, or 8 bytes, respectively—of each source vector element. In some embodiments, optional size identifier 804 is included as an opcode prefix or suffix, "H," "S," "D," "Q," and "E," corresponding to precision levels—Half precision (2 bytes), Single precision (4 bytes), Double precision (8 bytes), and Quadruple precision (16 bytes), respectively—of each source vector element. In other embodiments, optional size identifier 804 is an instruction parameter or operand specifying the source vector element's size and/or precision level.

Source identifier 806, in some embodiments, is to specify a source vector register, such as the vector registers included in a processor's register file. FIG. 11 and its associated description further below describe an embodiment of a processor's register file. In some embodiments, source identifier 806 is to identify a memory location Destination identifier 808 and optional second destination identifier 810 are to identify two locations—either vector registers of the processor's register file or memory locations—to which to write execution results, according to some embodiments.

The format of instruction 800 can specify optional parameters, a few examples of which, without limitation, are illustrated as MATH OP 812 (e.g., Add, Subtract, Divide, Multiply, Modulus, etc.), LOGICAL OP 814 (e.g. AND, OR, NAND, NOR, XOR, XNOR, CMP, etc.), EXCHANGE 816, THRESHOLD 818, and FLOOR 820. In some embodiments, these optional parameters are included as part of the opcode, separated perhaps by underscores. In other embodiments, these parameters are separate operands or instruction fields.

In some embodiments, executing the instruction is to involve a read-modify-write, whereby the processor reads the contents of a memory location, modifies the data that was read, and writes the result back to the memory location. The optional parameters described above can serve to modify the operation that is performed during the modify stage.

For example, opcode modifier, MATH OP 812 can be _ADD_, in which case the processor is to read the data at the location identified by destination identifier 808, add the data at the location identified by the source identifier 806, and write the result back to the location identified by the destination identifier 808, and, if the instruction includes an optional second destination identifier 810, to also write the result to the location identified by the optional second destination identifier 810, which can be a register.

RAOOPMEMREG Instruction
Exemplary Execution

Detailed herein are embodiments of an RAOOPMEMREG instruction to improve a computer itself. In particular, the execution of the RAOOPMEMREG instruction can be weakly ordered, can be executed by multiple circuits within a processor, and causes the processor to atomically read a datum from a memory location, perform an operation on the datum as specified by an opcode, and write a result of the operation back to the location identified by the destination identifier.

Figure 9:
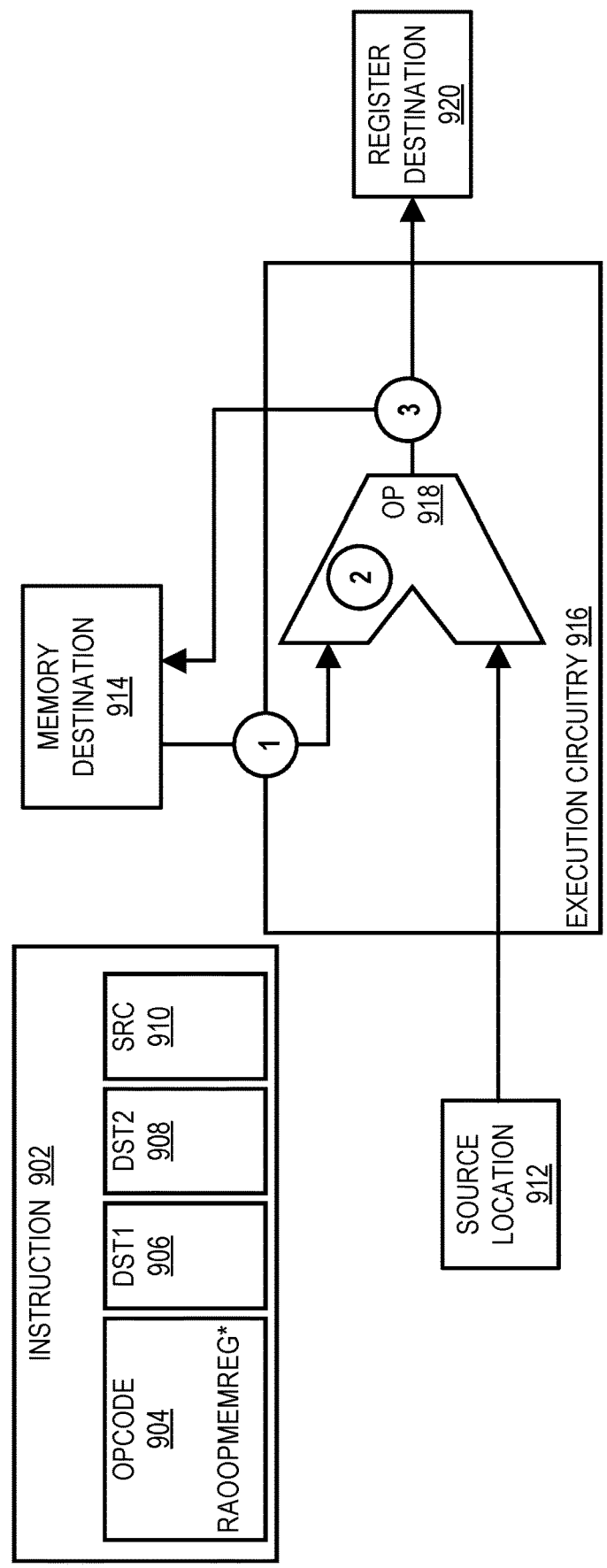
FIG. 9 is a block diagram illustrating an execution of a RAO instruction.

FIG. 9 is a block diagram illustrating an execution of a RAO instruction. The RAOOPMEMREG instruction 902 format includes fields for an opcode 904 (e.g., mnemonic "RAOOPMEMREG*"), a first destination operand (DST1 906) to specify a memory location, a second destination operand (DST2 908) to specify a register, and a source identifier (SRC 910) to specify a source location 912. (As used herein, the term "mnemonic" refers to an abbreviation for an operation, an instruction, or an opcode.) Opcode 904, RAOOPMEMREG*, as shown, includes an asterisk ("*"), which represents optional suffixes or prefixes that may be added to the opcode to control operations of the instruction.

In some embodiments, DST1 specifies a memory address of a cache line that is resident somewhere in a memory hierarchy: for example, in a L1 cache, a L2 cache, a Last level cache (LLC), or in memory. DST2 specifies a register in a register architecture, for example a general purpose register, a vector register, or a scalar floating point stack register file shown in FIG. 13. The source identifier SRC 910 in some embodiments identifies a register that holds an operand to be used in the operation. In some embodiments, the source identifier SRC 910 identifies a memory location.

As shown, the RAOOPMEMREG* instruction may operate on either scalar or vector quantities, without limitation. In some embodiments, DST1 906, DST2 908, and SRC 910 identify scalar data, in either integer or floating point format. In some embodiments, DST1 906, DST2 908, and SRC 910 identify vector data operated on in parallel by parallel hardware.

Execution circuitry 916, in response to an instruction having opcode 904 equal to RAOOPMEMREG*, first reads a datum from memory destination 914, second performs an operation (OP 918) on the datum and the contents of source location 912, and third writes a result of the operation back to the memory destination and also to the register destination 920. FIG. 9 clarifies the order of execution of the RAOOPMEMREG instruction using numbered circles, 1, 2, and 3, illustrated in execution order.

Exemplary Hardware to Execute the RAOOPMEMREG Instruction

Figure 10:
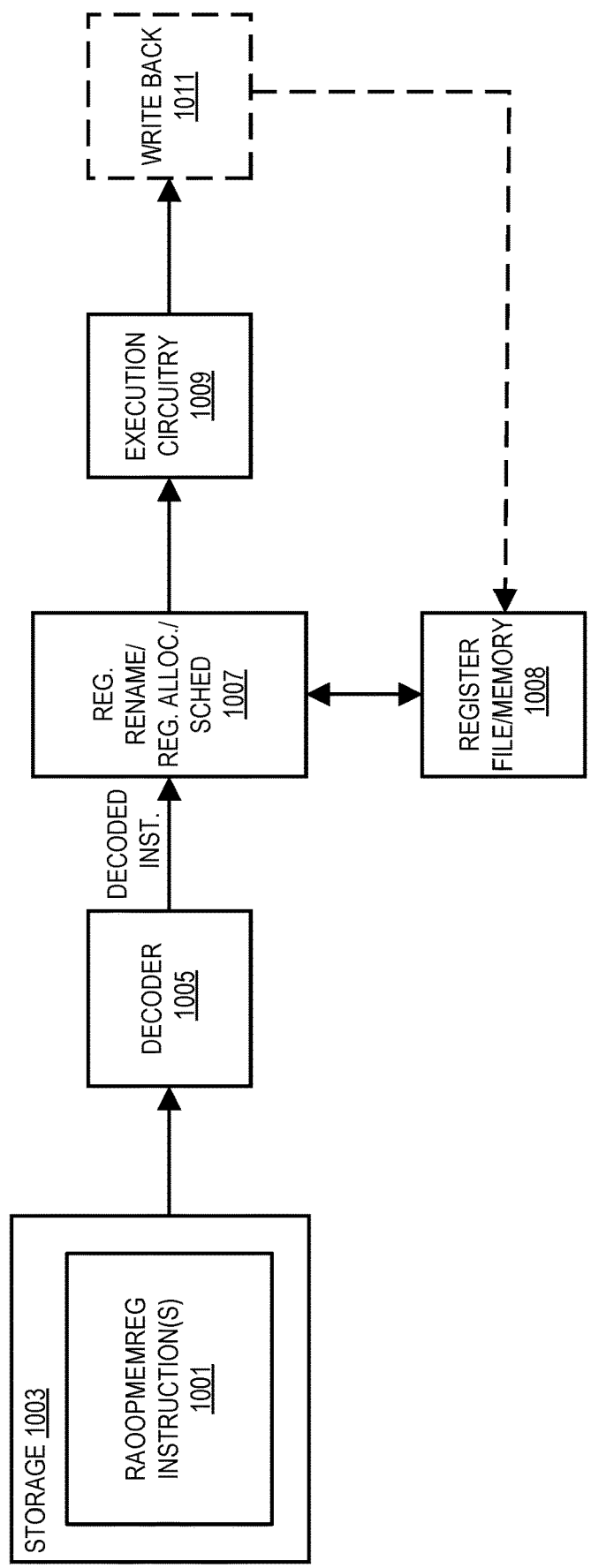
FIG. 10 illustrates an embodiment of hardware to process a RAO instruction.

FIG. 10 illustrates an embodiment of hardware to process a RAO instruction. As illustrated, storage 1003 stores a RAOOPMEMREG instruction 1001 to be executed.

The instruction is received by decode circuitry 1005. For example, decode circuitry 1005 receives this instruction from fetch logic/circuitry. The instruction 1001 includes fields for an opcode 904, a destination memory identifier to specify a memory destination, a destination register identifier to specify a register destination, and a source identifier to specify a source location. Decode circuitry 1005 decodes the instruction into one or more operations. In some embodiments, this decoding includes generating a plurality of micro-operations to be performed by execution circuitry (such as execution circuitry 1009 or 916). The decode circuitry 1005 also decodes instruction prefixes (if used).

In some embodiments, register renaming, register allocation, and/or scheduling circuitry 1007 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1008 store data as operands of the instruction to be operated on by execution circuitry. Exemplary register types include packed data registers, general purpose registers, and floating point registers.

Execution circuitry 1009 executes the decoded RAOOPMEMREG instruction. An embodiment of an execution circuit was shown and described with respect to FIG. 9, and is one embodiment of execution circuitry 1009. Write back (retirement) circuitry 1011 commits the result of the execution of the decoded RAOOPMEMREG instruction.

Exemplary Formats of the RAOOPMEMREG Instruction

In some embodiments, retirement/write back circuitry architecturally commits the destination register into the registers or memory and retires the instruction.

An embodiment of a format for a RAOOPMEMREG instruction is OPCODE, MEMDST, REGDST, and SRC. In some embodiments, RAOOPMEMREG {B/W/D/Q} is the opcode mnemonic of the instruction. SRCREG is a field to identify the packed data source register operand DSTREG is a field to identify the packed data destination register operand.

In some embodiments, the OPCODE field is a full opcode field, such as full opcode field 1274 (FIG. 12), or a real opcode field, such as 1230 (FIG. 12), the MEMDST field is a the SRCREG field is a Reg field, such as REG 1244 (FIG. 12), the DSTREG field is a R/M field, such as 1246 (FIG. 12).

In some embodiments, the RAOOPMEMREG instruction includes a field for a write mask register operand (k) (e.g., RAOOPMEMREG{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding writemask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the RAOOPMEMREG Instruction

FIG. 11 illustrates an embodiment of method performed by a processor to execute a RAO instruction. For example, the processor components of FIG. 10, a pipeline as detailed below, etc. perform this method.

At 1101, an instruction is fetched. For example, a RAOOPMEMREG instruction is fetched. The RAOOPMEMREG instruction includes fields for an opcode, a first destination operand to identify a memory location, a second destination operand to specify, and a source operand to identify a source. In some embodiments, the instruction further includes a field for a writemask. In some embodiments, the instruction is fetched from an instruction cache. The destination operand specifies a packed data vector register. The opcode of the RAOOPMEMREG instruction indicates a Vector REGister element is BROADCASTed.

The fetched instruction is decoded at 1103. For example, the fetched RAOOPMEMREG instruction is decoded by decode circuitry such as that detailed herein.

The decoded instruction is scheduled (as needed) at 1105.

At 1107, the decoded instruction is executed by execution circuitry (such as 916 or 1009). For the RAOOPMEMREG instruction, the execution causes execution circuitry to read data from the destination memory location, perform an operation using the data and the source register as operands, and write a result of the operation back to the destination memory location. For example, in one embodiment, the execution circuitry performs a read-modify-write to read a scalar value stored in memory, add a value stored in a register to the scalar value, and write it back to the memory location. In another embodiment, the execution circuitry performs a read-modify-write to read a vector from memory, multiply each element of the vector by a value stored in a general purpose register, and write the vector back to memory. In another embodiment, the execution circuitry performs a read-modify-write to read a vector from memory, compare the vector to a vector stored in a vector register to identify a maximum value for each element, and write the resulting vector back to the memory location, with each element of the resulting vector set to the maximum of the previous contents of the vector in memory and the vector in the vector register.

In some embodiments, the instruction is committed or retired at 1109.

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 12 illustrates an exemplary AVX instruction format including a VEX prefix 1202, real opcode field 1230, Mod R/M byte 1240, SIB byte 1250, displacement field 1262, and IMM8 1272. FIG. 12B illustrates which fields from FIG. 12 make up a full opcode field 1274 and a base operation field 1242. FIG. 12C illustrates which fields from FIG. 12 make up a register index field 1244.

VEX Prefix (Bytes 0-2) 1202 is encoded in a three-byte form. The first byte is the Format Field 1240 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1205 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit [5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1215 (VEX byte 1, bits [4:0]—mmmmm) includes content to encode an implied leading opcode byte. W Field 1264 (VEX byte 2, bit [7]—W)—is represented by the notation VEX.W, and provides different functions depending on the instruction. The role of VEX.vvvv 1220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1268 Size field (VEX byte 2, bit [2]-L)=0, it indicates 128 bit vector; if VEX.L=1, it indicates 256 bit vector. Prefix encoding field 1225 (VEX byte 2, bits [1:0]-pp) provides additional bits for the base operation field.

Real Opcode Field 1230 (Byte 3) is also known as the opcode byte. Part of the opcode is specified in this field.

MOD R/M Field 1240 (Byte 4) includes MOD field 1242 (bits [7-6]), Reg field 1244 (bits [5-3]), and R/M field 1246 (bits [2-0]). The role of Reg field 1244 may include the following: encoding either the destination register operand or a source register operand (the rrr of Rrrr), or be treated as an opcode extension and not used to encode any instruction operand. The role of R/M field 1246 may include the following: encoding the instruction operand that references a memory address, or encoding either the destination register operand or a source register operand.

Scale, Index, Base (SIB)—The content of Scale field 1250 (Byte 5) includes SS1252 (bits [7-6]), which is used for memory address generation. The contents of SIB.xxx 1254 (bits [5-3]) and SIB.bbb 1256 (bits [2-0]) have been previously referred to with regard to the register indexes Xxxx and Bbbb.

The Displacement Field 1262 and the immediate field (IMM8) 1272 contain data.

Exemplary Register Architecture

Figure 13:
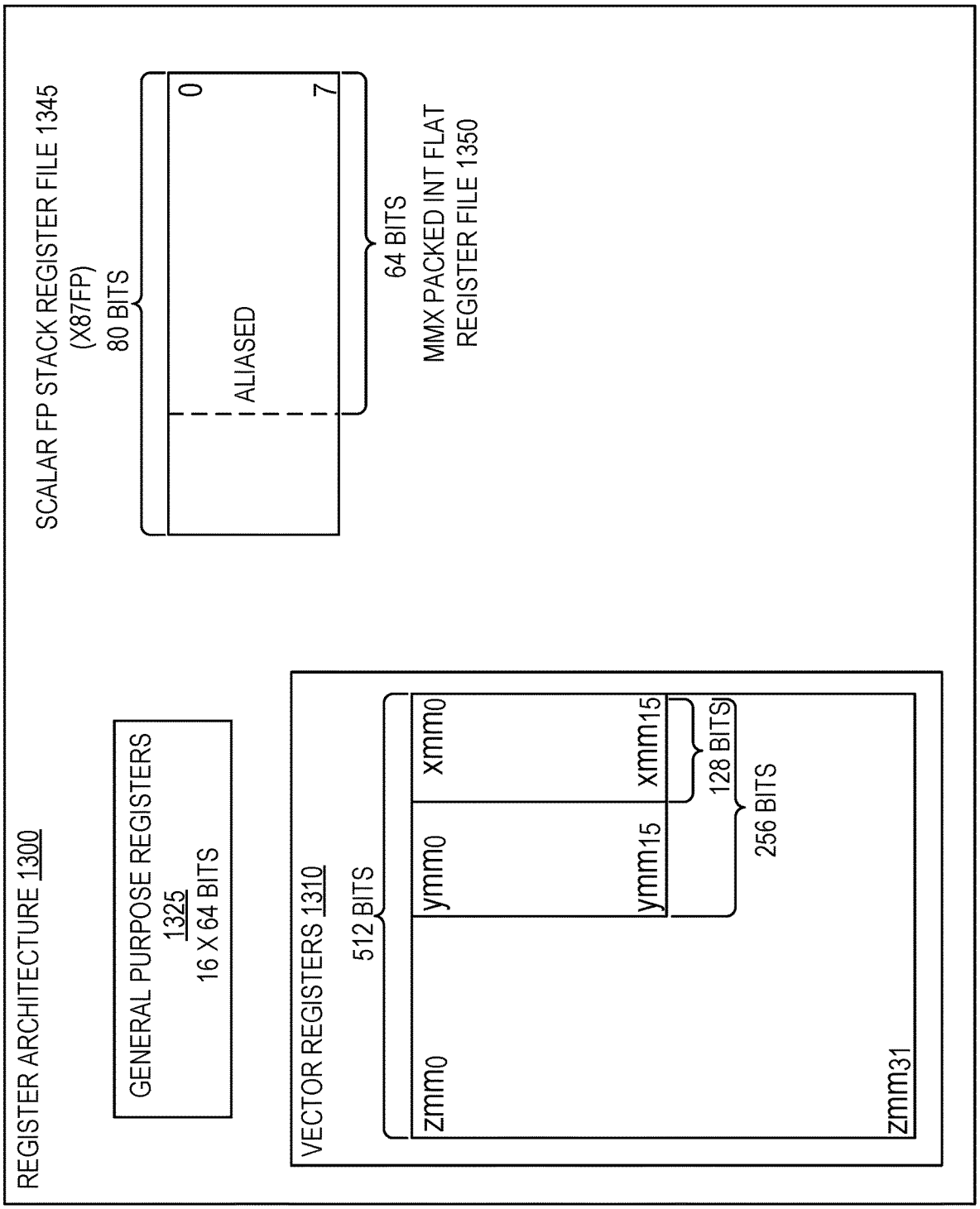
FIG. 13 is a block diagram of a register architecture according to one embodiment of the invention.

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length-decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 15B:
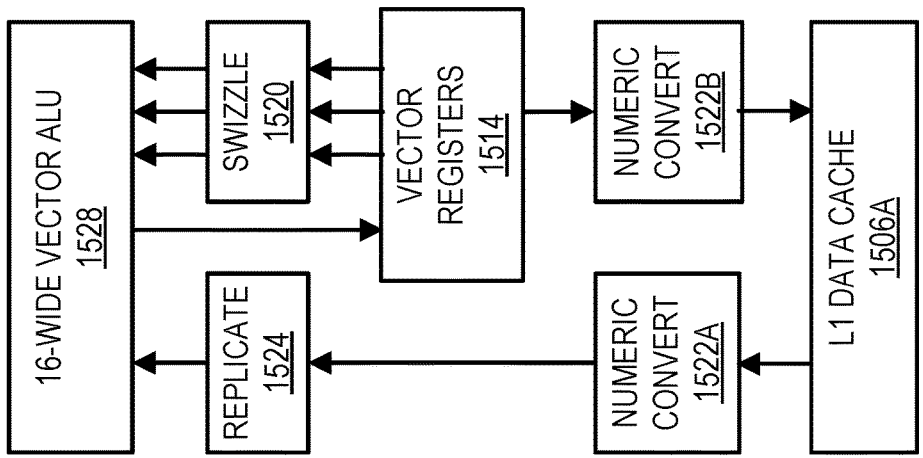
FIGS. 15A-B illustrate a block diagram of a more specific exemplary in-order core architecture, which core would be one of several logic blocks (including other cores of the same type and/or different types) in a chip.
Figure 15A:
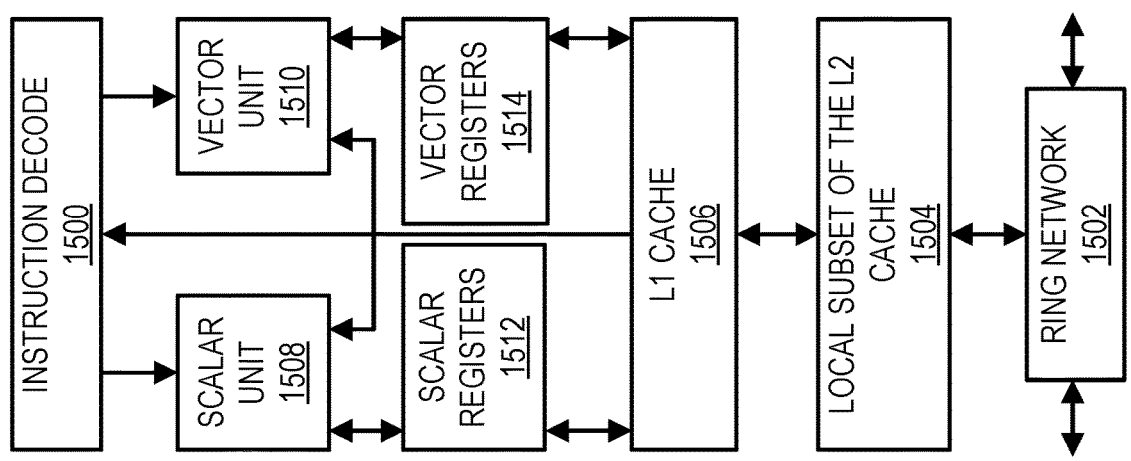

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the ring network 1502 (e.g., an on-die interconnect network) and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network 1502 ensures coherency for shared data. The ring network 1502 is bi-directional to allow agents such as processor cores, L2 caches and other logic blocks to communicate with each other within the chip. Each ring datapath is 1024-bits wide per direction in some embodiments.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input.

Processor with Integrated Memory Controller and Graphics

Figure 16:
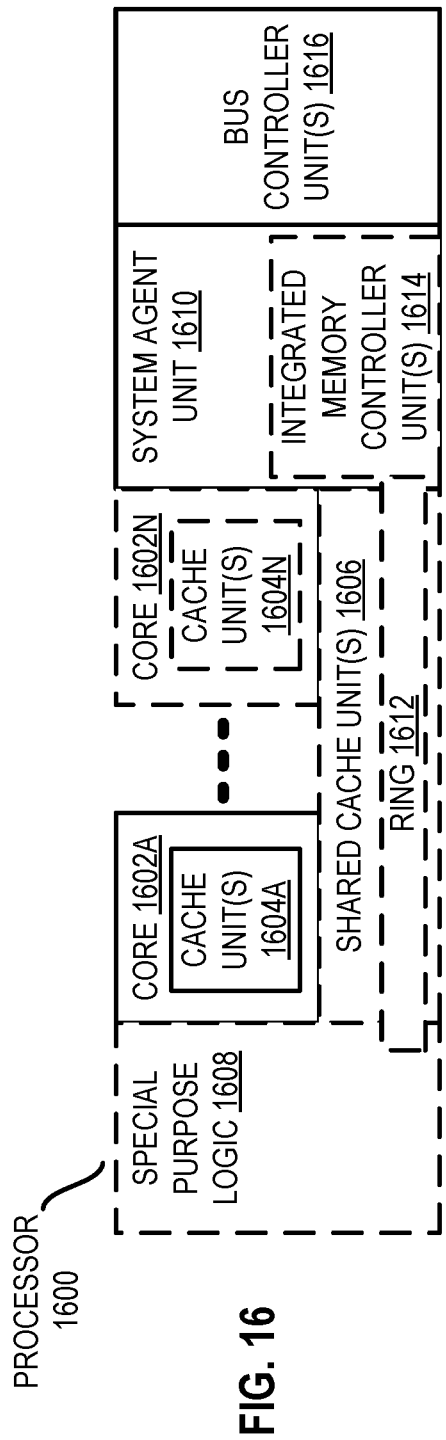
FIG. 16 is a block diagram of a processor that may have more than one core, may have an integrated memory controller, and may have integrated graphics according to embodiments of the invention.

FIG. 16 is a block diagram of a processor that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores 1604A-N, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multithreading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
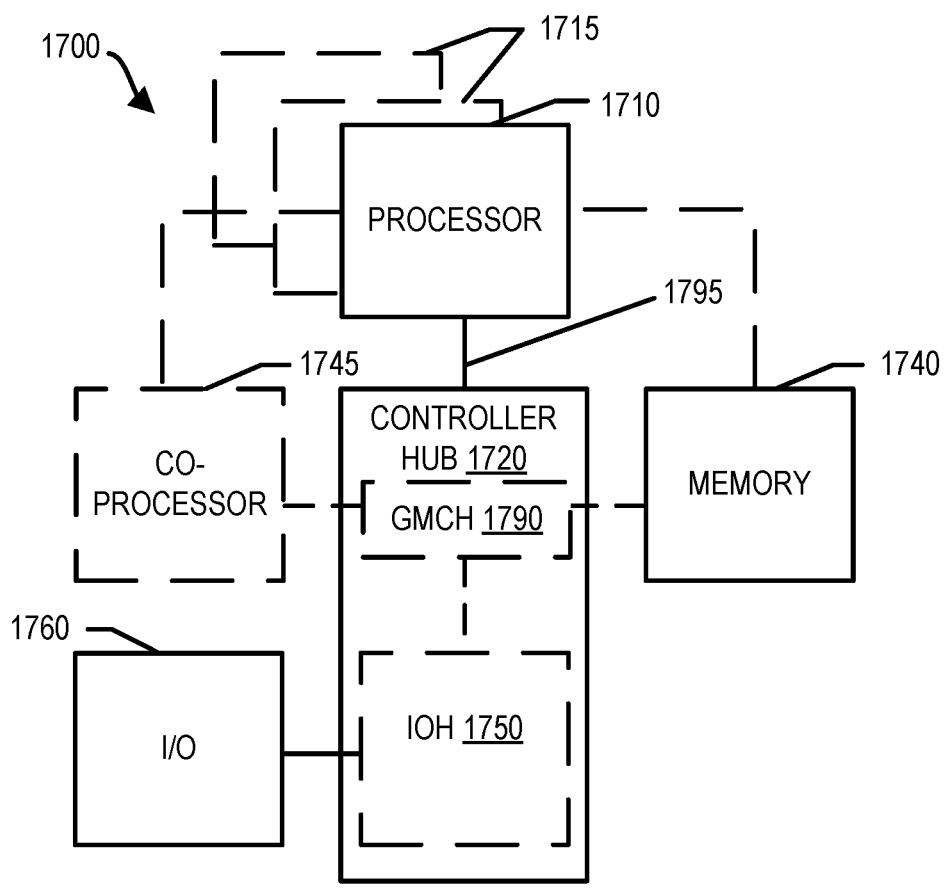
FIGS. 17-20 are block diagrams of exemplary computer architectures.

Referring now to FIG. 17, shown is a block diagram of a system in accordance with one embodiment of the present invention. The system 1700 may include one or more processors 1710, 1715, which are coupled to a controller hub 1720. In one embodiment, the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface, or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 17155 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
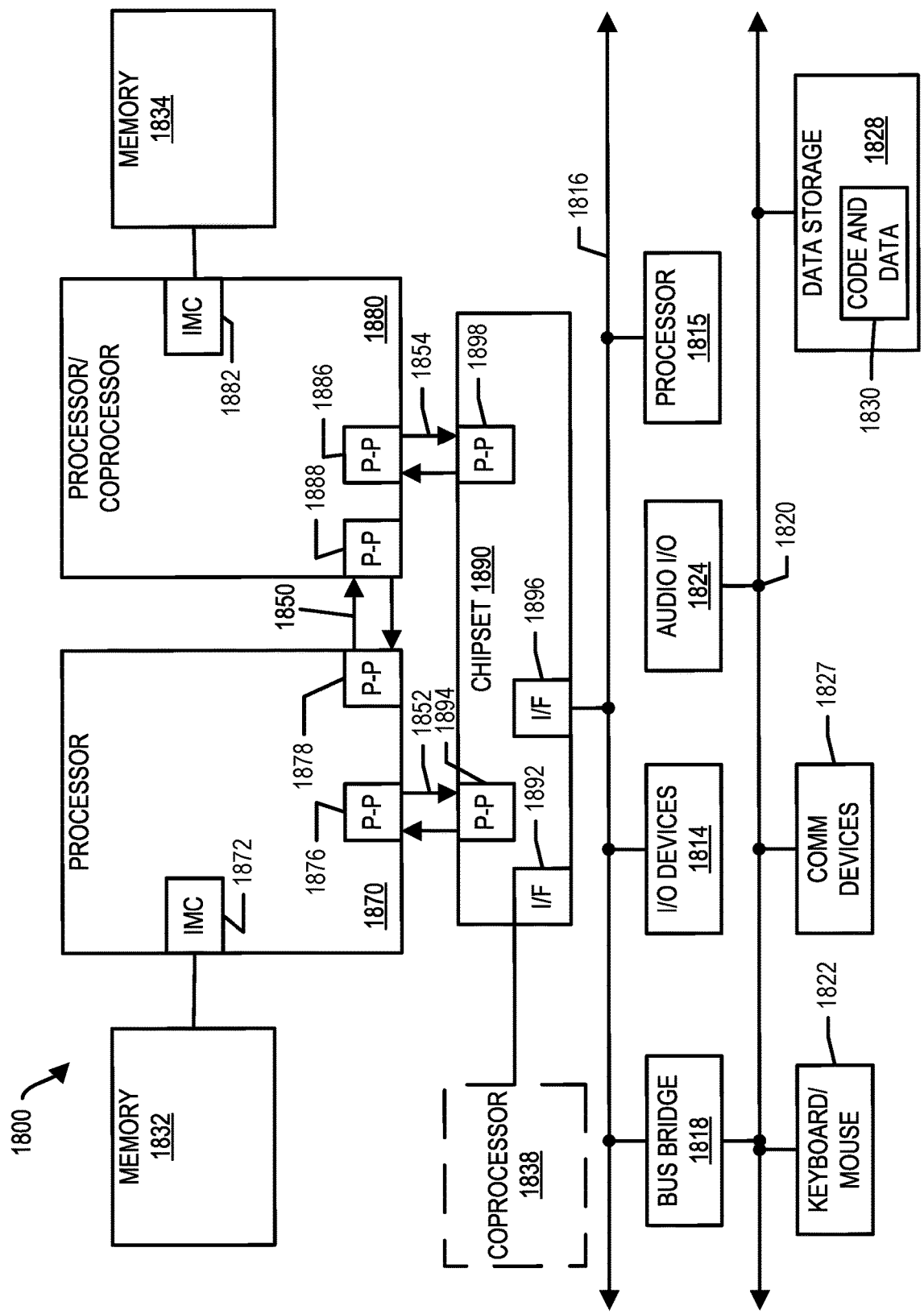

Referring now to FIG. 18, shown is a block diagram of a first more specific exemplary system in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes, as part of its bus-controller units, point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1816. Note that other architectures are possible. For example, instead of the point-to-point architecture of FIG. 18, a system may implement a multi-drop bus or other such architecture.

Figure 19:
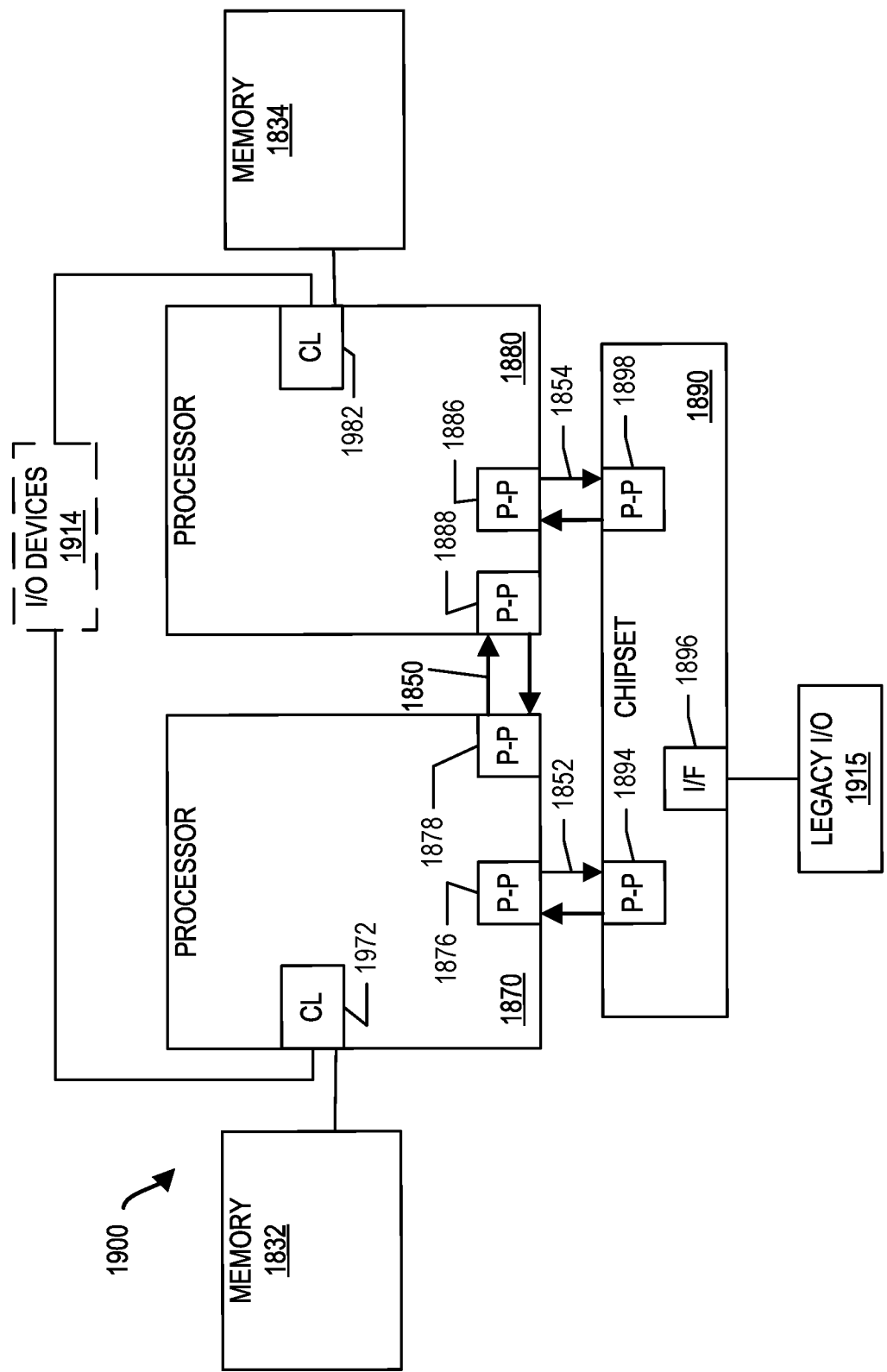

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1972 and 1982, respectively. Thus, the CL 1972, 1982 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
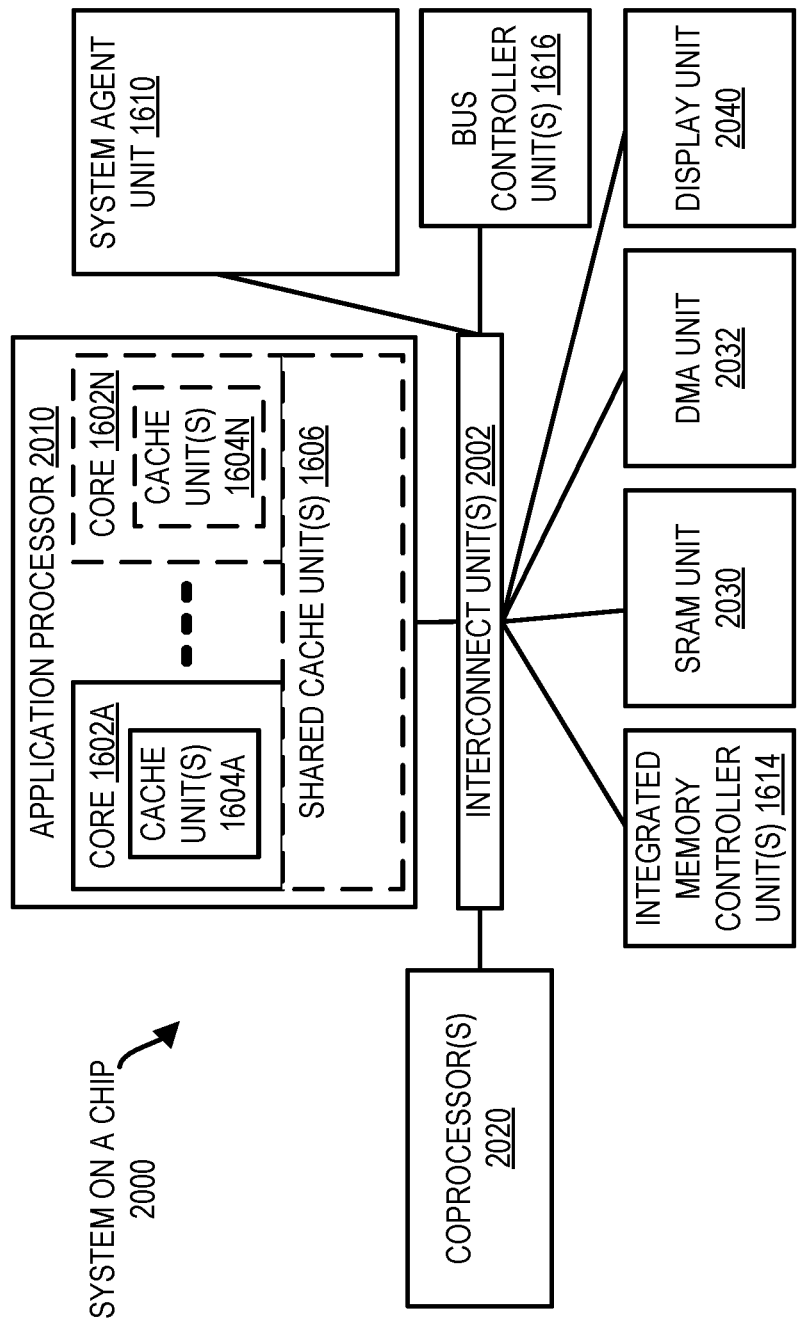

Referring now to FIG. 20, shown is a block diagram of a system on a chip (SoC) 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N, cache units 1604A-N, and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
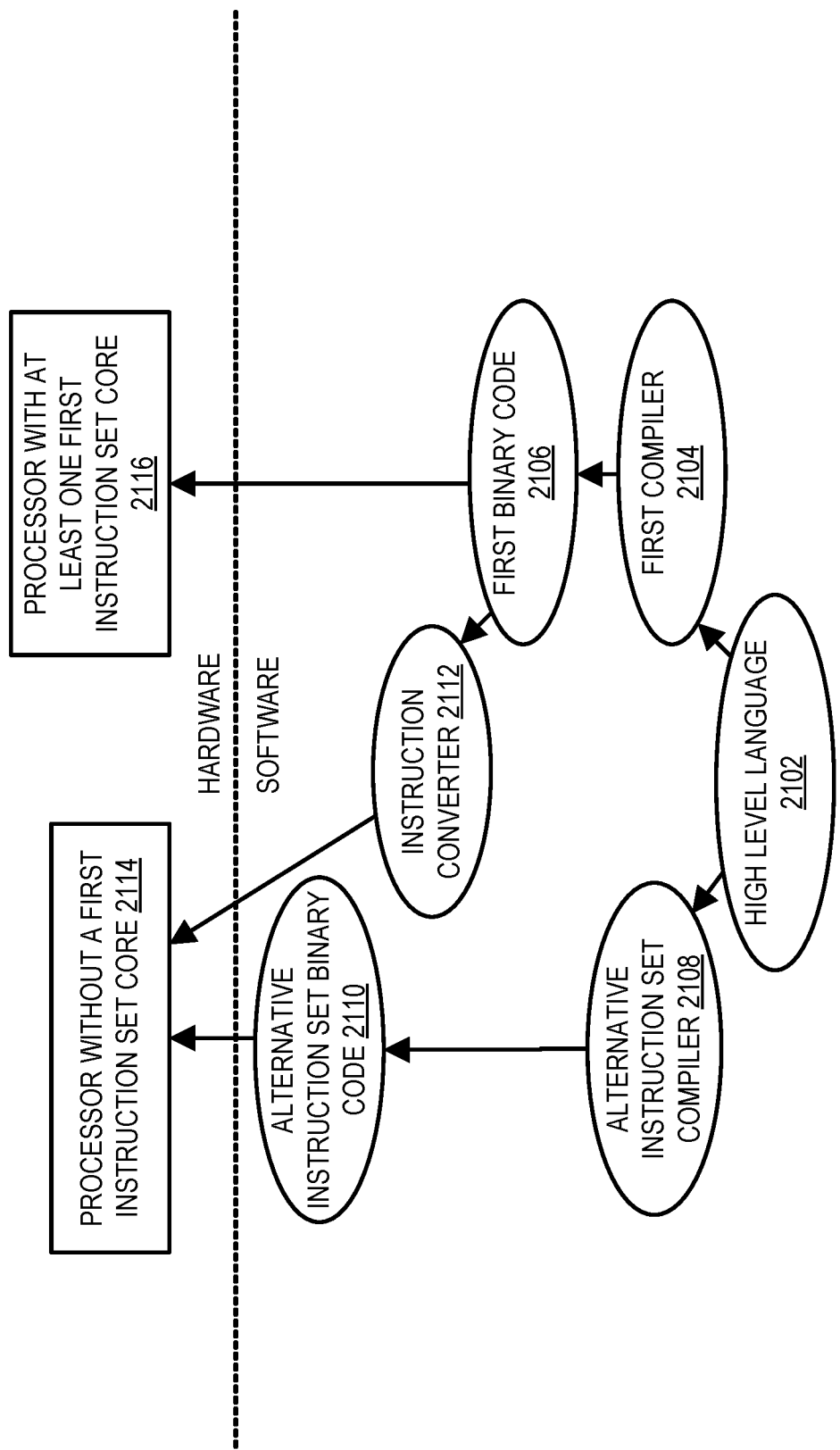
FIG. 21 is a block diagram contrasting the use of a software instruction converter to convert binary instructions in a source instruction set to binary instructions in a target instruction set according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using a first compiler 2104 to generate a first binary code (e.g., x86) 2106 that may be natively executed by a processor with at least one first instruction set core 2116. In some embodiments, the processor with at least one first instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 2104 represents a compiler that is operable to generate binary code of the first instruction set 2106 (e.g., object code) that can, with or without additional linkage processing, be executed on the processor with at least one first instruction set core 2116. Similarly, FIG. 21 shows the program in the high level language 2102 may be compiled using an alternative instruction set compiler 2108 to generate alternative instruction set binary code 2110 that may be natively executed by a processor without at least one first instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the first binary code 2106 into code that may be natively executed by the processor without a first instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have a first instruction set processor or core to execute the first binary code 2106.

FURTHER EXAMPLES

Example 1 provides a method of executing an instruction atomically and with weak order, the method comprising: fetching, by fetch circuitry, the instruction from code storage, the instruction comprising an opcode, a source identifier, and a destination identifier; decoding, by decode circuitry, the fetched instruction, and executing, by execution circuitry, the decoded instruction out of order with respect to other instructions, with an order selected to optimize at least one of latency, throughput, power, and performance, wherein the executing comprises atomically reading a datum from a location identified by the destination identifier, performing an operation on the datum as specified by the opcode, the operation to use a source operand identified by the source identifier, and writing a result of the operation to the location identified by the destination identifier.

Example 2 includes the substance of the exemplary method of Example 1, wherein the execution circuitry is to be a part of one or more circuits within a processor, the multiple circuits comprising at least a plurality of cores, a private cache controller to control a private cache of at least one of the plurality of cores, a shared cache controller to control a cache to be shared among two or more of the plurality of cores, a memory controller to control memory accesses from two or more of the plurality of cores, and at least one cache control circuit, sometimes referred to as a caching and home agent (CHA) coupled to at least one of the plurality of cores.

Example 3 includes the substance of the exemplary method of Example 2, wherein the method further comprises selecting, by a scheduling circuit, an execution circuit in one of the multiple circuits to execute the instruction, wherein at least one of the multiple circuits is to generate heuristics indicating a measured power and performance state, and wherein the scheduling circuit is to use the heuristics to select the execution circuit.

Example 4 includes the substance of the exemplary method of Example 3, wherein the multiple circuits further comprise at least one of a coprocessor and a hardware accelerator.

Example 5 includes the substance of the exemplary method of Example 4, wherein the instruction is further to include a hint to suggest which of the multiple circuits is to execute the decoded instruction, wherein the hint comprises at least one of an opcode prefix, an opcode suffix, an immediate, and a register identifier to identify a register.

Example 6 includes the substance of the exemplary method of Example 1, wherein the operation is one of a plurality of operations comprising at least: integer addition, integer subtraction, integer exchange and add, floating point addition, floating point subtraction, and floating point exchange and add.

Example 7 includes the substance of the exemplary method of Example 1, wherein the operation is one of a plurality of operations comprising at least: saturating addition, addition with threshold, subtraction with floor, subtraction with threshold, a logical operation, exchange, compare and exchange, update to minimum, update to minimum and exchange, update to maximum, and update to maximum and exchange.

Example 8 includes the substance of the exemplary method of any one of Examples 1-7, wherein the fetch circuitry, decode circuitry, and execution circuitry are further to fetch, decode, and execute a plurality of strongly ordered instructions in order according to a more strongly ordered memory model.

Example 9 includes the substance of the exemplary method of any one of Examples 1-7, wherein the instruction includes a second destination identifier to identify a register, and wherein the execution circuitry is further to write the result of the operation to the register.

Example 10 includes the substance of the exemplary method of any one of Examples 1-7, further comprising a page table having a plurality of page table entries, each page table entry to store a mapping between a virtual address and a physical address for an associated memory page, wherein each page table entry is further to specify whether remote atomic operations to the associated memory page are to be weakly ordered.

Example 11 provides a system for executing an instruction atomically and with weak order, the system comprising: a memory, and a processor comprising: fetch circuitry to fetch the instruction from a code storage, the instruction comprising an opcode, a source identifier, and a destination identifier; decode circuitry to decode the fetched instruction, and execution circuitry to execute the decoded instruction out of order with respect to other instructions, with an order selected to optimize at least one of latency, throughput, power, and performance, wherein the executing comprises atomically reading a datum from a location identified by the destination identifier, performing an operation on the datum as specified by the opcode, the operation to use a source operand identified by the source identifier, and writing a result of the operation to the location identified by the destination identifier.

Example 12 includes the substance of the exemplary system of Example 11, wherein the execution circuitry is to be a part of one or more circuits within the processor, the multiple circuits comprising at least a plurality of cores, a private cache controller to control a private cache of at least one of the plurality of cores, a shared cache controller to control a cache to be shared among two or more of the plurality of cores, a memory controller to control memory accesses from two or more of the plurality of cores, and at least one cache control circuit coupled to at least one of the plurality of cores.

Example 13 includes the substance of the exemplary system of Example 12, wherein the processor further comprises a scheduling circuit to select an execution circuit in one of the multiple circuits to execute the instruction, wherein at least one of the multiple circuits is to generate heuristics indicating a measured power and performance state, and wherein the scheduling circuit is to use the heuristics to select the execution circuit.

Example 14 includes the substance of the exemplary system of Example 13, wherein the multiple circuits further comprise at least one of a coprocessor and a hardware accelerator.

Example 15 includes the substance of the exemplary system of Example 14, wherein the instruction is further to include a hint to suggest which of the multiple circuits is to execute the decoded instruction, wherein the hint comprises at least one of an opcode prefix, an opcode suffix, an immediate, and a register identifier to identify a register.

Example 16 includes the substance of the exemplary system of Example 11, wherein the operation is one of a plurality of operations comprising at least: integer addition, integer subtraction, integer exchange and add, floating point addition, floating point subtraction, and floating point exchange and add.

Example 17 includes the substance of the exemplary system of Example 11, wherein the operation is one of a plurality of operations comprising at least: saturating addition, addition with threshold, subtraction with floor, subtraction with threshold, a logical operation, exchange, compare and exchange, update to minimum, update to minimum and exchange, update to maximum, and update to maximum and exchange.

Example 18 includes the substance of the exemplary system of any one of Examples 11-17, wherein the fetch circuitry, decode circuitry, and execution circuitry are further to fetch, decode, and execute a plurality of strongly ordered instructions in order according to a more strongly ordered memory model.

Example 19 includes the substance of the exemplary system of any one of Examples 11-17, wherein the instruction includes a second destination identifier to identify a register, and wherein the execution circuitry is further to write the result of the operation to the register.

Example 20 includes the substance of the exemplary system of any one of Examples 11-17, further comprising a page table having a plurality of page table entries, each page table entry to store a mapping between a virtual address and a physical address for an associated memory page, wherein each page table entry is further to specify whether remote atomic operations to the associated memory page are to be weakly ordered.

Example 21 provides an apparatus for executing an instruction atomically and with weak order, the apparatus comprising: means for fetching the instruction from a code storage, the instruction comprising an opcode, a source identifier, and a destination identifier; means for decoding the fetched instruction, and means for executing the decoded instruction out of order with respect to other instructions, with an order selected to optimize at least one of latency, throughput, power, and performance, wherein the executing comprises atomically reading a datum from a location identified by the destination identifier, performing an operation on the datum as specified by the opcode, the operation to use a source operand identified by the source identifier, and writing a result of the operation to the location identified by the destination identifier.

Example 22 includes the substance of the exemplary apparatus of Example 21, wherein the means for executing is to be a part of one or more i circuits within the apparatus, the multiple circuits comprising at least a plurality of cores, a private cache controller to control a private cache of at least one of the plurality of cores, a shared cache controller to control a cache to be shared among two or more of the plurality of cores, a memory controller to control memory accesses from two or more of the plurality of cores, and at least one cache control circuit coupled to at least one of the plurality of cores.

Example 23 includes the substance of the exemplary apparatus of Example 22, further comprising means for selecting an execution circuit in one of the multiple circuits to execute the instruction, wherein at least one of the multiple circuits is to generate heuristics indicating a measured power and performance state, and wherein the means for selecting is to use the heuristics to select the execution circuit.

Example 24 includes the substance of the exemplary apparatus of Example 23, wherein the multiple circuits further comprise at least one of a coprocessor and a hardware accelerator.

Example 25 includes the substance of the exemplary apparatus of Example 24, wherein the instruction is further to include a hint to suggest which of the multiple circuits is to execute the decoded instruction, wherein the hint comprises at least one of an opcode prefix, an opcode suffix, an immediate, and a register identifier to identify a register.

Example 26 includes the substance of the exemplary apparatus of Example 21, wherein the operation is one of a plurality of operations comprising at least: integer addition, integer subtraction, integer exchange and add, floating point addition, floating point subtraction, and floating point exchange and add.

Example 27 includes the substance of the exemplary apparatus of Example 21, wherein the operation is one of a plurality of operations comprising at least: saturating addition, addition with threshold, subtraction with floor, subtraction with threshold, a logical operation, exchange, compare and exchange, update to minimum, update to minimum and exchange, update to maximum, and update to maximum and exchange.

Example 28 includes the substance of the exemplary apparatus of any one of Examples 21-27, wherein the means for fetching, means for decoding, and means for executing are further to fetch, decode, and execute a plurality of strongly ordered instructions in order according to a more strongly ordered memory model.

Example 29 includes the substance of the exemplary apparatus of any one of Examples 21-27, wherein the instruction includes a second destination identifier to identify a register, and wherein the means for executing is further to write the result of the operation to the register.

Example 30 includes the substance of the exemplary apparatus of any one of Examples 21-27, further comprising a page table having a plurality of page table entries, each page table entry to store a mapping between a virtual address and a physical address for an associated memory page, wherein each page table entry is further to specify whether remote atomic operations to the associated memory page are to be weakly ordered.

Example 31 provides a non-transitory machine-readable medium containing instructions that, when executed by a processor, cause the processor to: fetch, by fetch circuitry, the instruction from code storage, the instruction comprising an opcode, a source identifier, and a destination identifier; decode, by decode circuitry, the fetched instruction, and execute, by execution circuitry, the decoded instruction out of order with respect to other instructions, with an order selected to optimize at least one of latency, throughput, power, and performance, wherein the executing comprises atomically reading a datum from a location identified by the destination identifier, performing an operation on the datum as specified by the opcode, the operation to use a source operand identified by the source identifier, and writing a result of the operation to the location identified by the destination identifier.

Example 32 includes the substance of the exemplary non-transitory machine-readable medium of Example 31, wherein the execution circuitry is to be a part of one or more circuits within the processor, the multiple circuits comprising at least a plurality of cores, a private cache controller to control a private cache of at least one of the plurality of cores, a shared cache controller to control a cache to be shared among two or more of the plurality of cores, a memory controller to control memory accesses from two or more of the plurality of cores, and at least one cache control circuit coupled to at least one of the plurality of cores.

Example 33 includes the substance of the exemplary non-transitory machine-readable medium of Example 32, wherein the processor is further to select, by a scheduling circuit, an execution circuit in one of the multiple circuits to execute the instruction, wherein at least one of the multiple circuits is to generate heuristics indicating a measured power and performance state, and wherein the scheduling circuit is to use the heuristics to select the execution circuit.

Example 34 includes the substance of the exemplary non-transitory machine-readable medium of Example 33, wherein the multiple circuits further comprise at least one of a coprocessor and a hardware accelerator.

Example 35 includes the substance of the exemplary non-transitory machine-readable medium of Example 34, wherein the instruction is further to include a hint to suggest which of the multiple circuits is to execute the decoded instruction, wherein the hint comprises at least one of an opcode prefix, an opcode suffix, an immediate, and a register identifier to identify a register.

Example 36 includes the substance of the exemplary non-transitory machine-readable medium of Example 31, wherein the operation is one of a plurality of operations comprising at least: integer addition, integer subtraction, integer exchange and add, floating point addition, floating point subtraction, and floating point exchange and add.

Example 37 includes the substance of the exemplary non-transitory machine-readable medium of Example 31, wherein the operation is one of a plurality of operations comprising at least: saturating addition, addition with threshold, subtraction with floor, subtraction with threshold, a logical operation, exchange, compare and exchange, update to minimum, update to minimum and exchange, update to maximum, and update to maximum and exchange.

Example 38 includes the substance of the exemplary non-transitory machine-readable medium of any one of Examples 31-37, wherein the fetch circuitry, decode circuitry, and execution circuitry are further to fetch, decode, and execute a plurality of strongly ordered instructions in order according to a more strongly ordered memory model.

Example 39 includes the substance of the exemplary non-transitory machine-readable medium of any one of Examples 31-37, wherein the instruction includes a second destination identifier to identify a register, and wherein the execution circuitry is further to write the result of the operation to the register.

Example 40 includes the substance of the exemplary non-transitory machine-readable medium of any one of Examples 31-37, further comprising a page table having a plurality of page table entries, each page table entry to store a mapping between a virtual address and a physical address for an associated memory page, wherein each page table entry is further to specify whether remote atomic operations to the associated memory page are to be weakly ordered.

Example 41 provides a processor for executing wn instruction atomically and with weak order, the processor comprising: fetch circuitry to fetch the instruction from a code storage, the instruction comprising an opcode, a source identifier, and a destination identifier; decode circuitry to decode the fetched instruction, and execution circuitry to execute the decoded instruction out of order with respect to other instructions, with an order selected to optimize at least one of latency, throughput, power, and performance, wherein the executing comprises atomically reading a datum from a location identified by the destination identifier, performing an operation on the datum as specified by the opcode, the operation to use a source operand identified by the source identifier, and writing a result of the operation to the location identified by the destination identifier.

Example 42 includes the substance of the exemplary processor of Example 41, wherein the execution circuitry is to be a part of one or more circuits within the processor, the multiple circuits comprising at least a plurality of cores, a private cache controller to control a private cache of at least one of the plurality of cores, a shared cache controller to control a cache to be shared among two or more of the plurality of cores, a memory controller to control memory accesses from two or more of the plurality of cores, and at least one cache control circuit coupled to at least one of the plurality of cores.

Example 43 includes the substance of the exemplary processor of Example 42, wherein the processor further comprises a scheduling circuit to select an execution circuit in one of the multiple circuits to execute the instruction, wherein at least one of the multiple circuits is to generate heuristics indicating a measured power and performance state, and wherein the scheduling circuit is to use the heuristics to select the execution circuit.

Example 44 includes the substance of the exemplary processor of Example 43, wherein the multiple circuits further comprise at least one of a coprocessor and a hardware accelerator.

Example 45 includes the substance of the exemplary processor of Example 44, wherein the instruction is further to include a hint to suggest which of the multiple circuits is to execute the decoded instruction, wherein the hint comprises at least one of an opcode prefix, an opcode suffix, an immediate, and a register identifier to identify a register.

Example 46 includes the substance of the exemplary processor of Example 41, wherein the operation is one of a plurality of operations comprising at least: integer addition, integer subtraction, integer exchange and add, floating point addition, floating point subtraction, and floating point exchange and add.

Example 47 includes the substance of the exemplary processor of Example 41, wherein the operation is one of a plurality of operations comprising at least: saturating addition, addition with threshold, subtraction with floor, subtraction with threshold, a logical operation, exchange, compare and exchange, update to minimum, update to minimum and exchange, update to maximum, and update to maximum and exchange.

Example 48 includes the substance of the exemplary processor of any one of Examples 41-47, wherein the fetch circuitry, decode circuitry, and execution circuitry are further to fetch, decode, and execute a plurality of strongly ordered instructions in order according to a more strongly ordered memory model.

Example 49 includes the substance of the exemplary processor of any one of Examples 41-47, wherein the instruction includes a second destination identifier to identify a register, and wherein the execution circuitry is further to write the result of the operation to the register.

Example 50 includes the substance of the exemplary processor of any one of Examples 41-47, further comprising a page table having a plurality of page table entries, each page table entry to store a mapping between a virtual address and a physical address for an associated memory page, wherein each page table entry is further to specify whether remote atomic operations to the associated memory page are to be weakly ordered.

Example 51 provides an apparatus for executing wn instruction atomically and with weak order, the apparatus comprising fetch circuitry to fetch the instruction from a code storage, the instruction comprising an opcode, a source identifier, and a destination identifier: decode circuitry to decode the fetched instruction, and execution circuitry to execute the decoded instruction out of order with respect to other instructions, with an order selected to optimize at least one of latency, throughput, power, and performance, wherein the executing comprises atomically reading a datum from a location identified by the destination identifier, performing an operation on the datum as specified by the opcode, the operation to use a source operand identified by the source identifier, and writing a result of the operation to the location identified by the destination identifier.

Example 52 includes the substance of the exemplary apparatus of Example 51, wherein the execution circuitry is to be a part of one or more circuits within the apparatus, the multiple circuits comprising at least a plurality of cores, a private cache controller to control a private cache of at least one of the plurality of cores, a shared cache controller to control a cache to be shared among two or more of the plurality of cores, a memory controller to control memory accesses from two or more of the plurality of cores, and at least one cache control circuit coupled to at least one of the plurality of cores.

Example 53 includes the substance of the exemplary apparatus of Example 52, wherein the apparatus further comprises a scheduling circuit to select an execution circuit in one of the multiple circuits to execute the instruction, wherein at least one of the multiple circuits is to generate heuristics indicating a measured power and performance state, and wherein the scheduling circuit is to use the heuristics to select the execution circuit.

Example 54 includes the substance of the exemplary apparatus of Example 53, wherein the multiple circuits further comprise at least one of a co-processor and a hardware accelerator.

Example 55 includes the substance of the exemplary apparatus of Example 54, wherein the instruction is further to include a hint to suggest which of the multiple circuits is to execute the decoded instruction, wherein the hint comprises at least one of an opcode prefix, an opcode suffix, an immediate, and a register identifier to identify a register.

Example 56 includes the substance of the exemplary apparatus of Example 51, wherein the operation is one of a plurality of operations comprising at least: integer addition, integer subtraction, integer exchange and add, floating point addition, floating point subtraction, and floating point exchange and add.

Example 57 includes the substance of the exemplary apparatus of Example 51, wherein the operation is one of a plurality of operations comprising at least: saturating addition, addition with threshold, subtraction with floor, subtraction with threshold, a logical operation, exchange, compare and exchange, update to minimum, update to minimum and exchange, update to maximum, and update to maximum and exchange.

Example 58 includes the substance of the exemplary apparatus of any one of Examples 51-57, wherein the fetch circuitry, decode circuitry, and execution circuitry are further to fetch, decode, and execute a plurality of strongly ordered instructions in order according to a more strongly ordered memory model.

Example 59 includes the substance of the exemplary apparatus of any one of Examples 51-57, wherein the instruction includes a second destination identifier to identify a register, and wherein the execution circuitry is further to write the result of the operation to the register.

Example 60 includes the substance of the exemplary apparatus of any one of Examples 51-57, further comprising a page table having a plurality of page table entries, each page table entry to store a mapping between a virtual address and a physical address for an associated memory page, wherein each page table entry is further to specify whether remote atomic operations to the associated memory page are to be weakly ordered.

What is claimed is:

1. A processor comprising:
    fetch circuitry configured to fetch an instruction from a code storage, the instruction comprising an opcode, a source identifier, and a destination identifier;
    decode circuitry configured to decode the fetched instruction; and
    a scheduling circuit configured to select an execution circuit among multiple circuits to execute the instruction,
    wherein the execution circuit is configured to execute the decoded instruction, the execution comprising atomically reading a datum from a location identified by the destination identifier, performing an operation on the datum as specified by the opcode, the operation to use a source operand identified by the source identifier, and writing a result of the operation back to the location identified by the destination identifier, and the instruction has an out of order ordering requirement for memory loads and stores when the location is not a register, and the instruction has an in order ordering requirement for memory loads and stores when the location is a destination register.

2. The processor of claim 1, wherein the execution circuit is a part of one or more circuits within the processor, the one or more circuits within the processor comprising at least a plurality of cores, a private cache controller to control a private cache of at least one of the plurality of cores, a shared cache controller to control a cache to be shared among two or more of the plurality of cores, and a memory controller to control memory accesses from two or more of the plurality of cores.

3. The processor of claim 1, wherein the scheduling circuit selects the execution circuit among the multiple circuits, wherein at least one of the multiple circuits generates heuristics indicating a measured power and performance state, and wherein the scheduling circuit uses the heuristics to select the location.

4. The processor of claim 3, wherein the multiple circuits further comprise at least one of a coprocessor or a hardware accelerator.

5. The processor of claim 4, wherein the instruction is further to include a hint to suggest which of the multiple circuits to select to execute the decoded instruction, wherein the hint comprises one of an opcode prefix, an opcode suffix, an immediate, or a register identifier to identify a register.

6. The processor of claim 1, wherein the instruction is one of integer addition, integer subtraction, integer saturating addition, integer subtraction with floor, logical AND, logical OR, logical XOR, floating point addition, floating point subtraction, update to minimum, update to maximum, integer addition with threshold, integer subtraction with threshold, integer exchange and add, exchange, compare and exchange, floating point exchange and add, update to minimum, or update to maximum.

7. The processor of claim 1, wherein the instruction includes a second destination identifier to identify the destination register, and the execution further comprising writing the result of the operation to the destination register.

8. A method comprising:
    fetching, by fetch circuitry, an instruction from code storage, the instruction comprising an opcode, a source identifier, and a destination identifier;
    decoding, by decode circuitry, the fetched instruction;
    selecting, by a scheduling circuit, an execution circuit among multiple circuits in a system;
    scheduling, by the scheduling circuit, execution of the decoded instruction; and
    executing the decoded instruction, by the execution circuit, to: atomically read a datum from a location identified by the destination identifier, perform an operation on the datum as specified by the opcode, the operation to use a source operand identified by the source identifier, and write a result of the operation back to the location, wherein the instruction has an out of order ordering requirement for memory loads and stores when the location is not a register, and the instruction has an in order ordering requirement for memory loads and stores when the location is a destination register.

9. The method of claim 8, wherein the execution circuit is a part of one or more circuits within a processor, the one or more circuits within the processor comprising at least a plurality of cores, a private cache controller to control a private cache of at least one of the plurality of cores, a shared cache controller to control a cache shared among two or more of the plurality of cores, and a memory controller to control memory accesses from two or more of the plurality of cores.

10. The method of claim 9, wherein at least one of the multiple circuits in the system generates heuristics relating to measured power and performance, and wherein the method further comprises using the generated heuristics, by the scheduling circuit, to inform its selection of the execution circuit.

11. The method of claim 10, wherein the multiple circuits comprise at least one of a coprocessor or a hardware accelerator.

12. The method of claim 11, wherein the instruction is further to include a hint to suggest which of the multiple circuits to select to execute the decoded instruction, wherein the hint comprises at least one of an opcode prefix, an opcode suffix, an immediate, or a register identifier to identify a register.

13. The method of claim 8, wherein the instruction is one of integer addition, integer addition with threshold, integer subtraction, integer subtraction with threshold, integer saturating addition, integer subtraction with floor, logical AND, logical OR, logical XOR, floating point addition, floating point subtraction, update to minimum, and update to maximum, integer exchange and add, exchange, compare and exchange, or floating point exchange and add.

14. The method of claim 8, wherein the instruction includes a second destination identifier to identify the destination register, and further comprising writing the result of the operation to the destination register.

15. The method of claim 8, further comprising accessing, by the scheduling circuit, a page table having a plurality of entries, each entry storing a mapping between a virtual address and a physical address for an associated memory page, wherein each entry further specifies whether to weakly order remote atomic operations to the associated memory page.

16. A system comprising:
a memory;
means for fetching an instruction from a code storage, the instruction comprising an opcode, a source identifier, and a destination identifier;
means for decoding the fetched instruction;
means for selecting an execution circuit among multiple circuits in the system; and
means for scheduling execution of the decoded instruction,
wherein the execution circuit to execute the decoded instruction to atomically read a datum from a location in the memory identified by the destination identifier, perform an operation on the datum as specified by the opcode, the operation to use a source operand identified by the source identifier, and write a result of the operation back to the location, wherein the instruction has an out of order ordering requirement for memory loads and stores when the location is not a register, and the instruction has an in order ordering requirement for memory loads and stores when the location is a destination register.

17. The system of claim 16, wherein the execution circuit is a part of one or more circuits within the system, the one or more circuits within the system comprising at least a plurality of cores, a private cache controller to control a private cache of at least one of the plurality of cores, a shared cache controller to control a cache shared among two or more of the plurality of cores, and a memory controller to control memory accesses from two or more of the plurality of cores.

18. The system of claim 17, further comprising means for selecting an execution circuit among the multiple circuits to execute the instruction, wherein at least one of the multiple circuits is to generate heuristics indicating a measured power and performance state, and wherein the means for selecting is to use the heuristics to select the execution circuit.

19. The system of claim 18, wherein the multiple circuits further comprise at least one of a coprocessor or a hardware accelerator.

20. The system of claim 19, wherein the instruction is further to include a hint to suggest which of the multiple circuits to select to execute the decoded instruction, wherein the hint comprises at least one of an opcode prefix, an opcode suffix, an immediate, or a register identifier to identify a register.

21. The system of claim 16, wherein the instruction is one of integer addition, integer addition with threshold, integer subtraction, integer subtraction with threshold, integer saturating addition, integer subtraction with floor, logical AND, logical OR, logical XOR, floating point addition, floating point subtraction, update to minimum, and update to maximum, integer exchange and add, exchange, compare and exchange, or floating point exchange and add.

22. The system of claim 16, wherein the instruction includes a second destination identifier to identify the destination register, and further comprising writing the result of the operation to the destination register.

* * * * *